US008686096B2

(12) United States Patent
Deetz et al.

(10) Patent No.: US 8,686,096 B2
(45) Date of Patent: Apr. 1, 2014

(54) SWELLABLE PARTICLES

(75) Inventors: Martin John Deetz, Horsham, PA (US); Biwang Jiang, Warrington, PA (US); Jiun-Chen Wu, West Windsor, NJ (US)

(73) Assignee: Rohm and Haas Company PA (US)

( * ) Notice: Subject to any disclaimer, the term of this patent is extended or adjusted under 35 U.S.C. 154(b) by 663 days.

(21) Appl. No.: 11/521,668

(22) Filed: Sep. 15, 2006

(65) Prior Publication Data

US 2007/0066761 A1  Mar. 22, 2007

Related U.S. Application Data

(60) Provisional application No. 60/717,955, filed on Sep. 16, 2005.

(51) Int. Cl.
*C08F 265/04* (2006.01)
*B01J 20/22* (2006.01)
*B01J 20/26* (2006.01)
*C08F 2/42* (2006.01)

(52) U.S. Cl.
CPC *B01J 20/22* (2013.01); *B01J 20/26* (2013.01); *B01J 20/261* (2013.01); *C08F 2/42* (2013.01)
USPC .................. 526/81; 526/82; 526/85; 524/458

(58) Field of Classification Search
USPC .................. 524/458; 526/219.2, 219.3, 219.6, 526/230.5, 232.1, 232, 85, 86, 87
See application file for complete search history.

(56) References Cited

U.S. PATENT DOCUMENTS

| | | | |
|---|---|---|---|
| 3,988,392 A | 10/1976 | Kameda | |
| 4,186,120 A * | 1/1980 | Ugelstad | 524/458 |
| 4,336,173 A * | 6/1982 | Ugelstad | 523/205 |
| 4,459,378 A | 7/1984 | Ugelstad | |
| 4,530,956 A * | 7/1985 | Ugelstad et al. | 524/458 |
| 4,542,171 A * | 9/1985 | Elser et al. | 523/201 |
| 4,564,644 A | 1/1986 | Harris | |
| 5,147,937 A | 9/1992 | Frazza | |
| 5,216,065 A * | 6/1993 | Colyer et al. | 524/459 |
| 5,231,115 A | 7/1993 | Harris | |
| 5,237,004 A * | 8/1993 | Wu et al. | 525/85 |
| 5,283,287 A | 2/1994 | Kim | |
| 5,292,844 A | 3/1994 | Young et al. | |
| 5,326,843 A * | 7/1994 | Lorah et al. | 526/318.6 |
| 5,412,036 A | 5/1995 | Traugott | |
| 5,455,315 A * | 10/1995 | Paine et al. | 526/79 |
| 5,464,916 A * | 11/1995 | Young et al. | 526/264 |
| 5,616,622 A | 4/1997 | Harris | |
| 5,696,199 A * | 12/1997 | Senkus et al. | 524/548 |
| 5,846,657 A * | 12/1998 | Wu | 428/402 |
| 6,174,929 B1 | 1/2001 | Hahnle et al. | |
| 6,239,224 B1 | 5/2001 | M.o slashed.rk et al. | |
| 6,245,410 B1 | 6/2001 | Hahnle et al. | |
| 6,322,861 B1 * | 11/2001 | Wu | 428/1.55 |
| 6,342,561 B1 | 1/2002 | Engel et al. | |
| 6,346,592 B1 * | 2/2002 | S.ae butted.thre et al. | 526/319 |
| 6,391,429 B1 | 5/2002 | Senkus | |
| 6,503,680 B1 | 1/2003 | Chen | |
| 6,657,011 B2 * | 12/2003 | Lau et al. | 525/221 |
| 6,855,761 B2 * | 2/2005 | Muranaka et al. | 524/460 |
| 6,875,817 B2 * | 4/2005 | Deorkar et al. | 525/244 |
| 6,949,601 B1 | 9/2005 | Leth-Olsen | |
| 7,217,762 B1 * | 5/2007 | Jorgedal et al. | 524/800 |
| 2004/0069710 A1 * | 4/2004 | Sirkar et al. | 210/649 |
| 2006/0237367 A1 * | 10/2006 | Fisher et al. | 210/656 |
| 2007/0265390 A1 | 11/2007 | Jorgedal et al. | |

FOREIGN PATENT DOCUMENTS

| | | |
|---|---|---|
| EP | 1046658 | 10/2000 |
| JP | 2006-063222 | 3/2006 |
| WO | WO97/40076 | 10/1997 |
| WO | WO 2005/090413 A1 | 9/2005 |

OTHER PUBLICATIONS

Pennwalt Corp "T-Butyl Perocotate MSDS". No Author, No Date.*
"Benzoyl Peroxide MSDS". No Author, No Date.*
MSDS HyperGlossary: Solubility. No Author, No Date. Obtained from www.ilpi.com/msds/ref/solubility.html.*
Alduncin et al. Macromolecules 1994, 27, pp. 2256-2261.*
Ugelstad et al. Makromol. Chem. 180, 737-744 (1979).*

* cited by examiner

*Primary Examiner* — Michael Pepitone
*Assistant Examiner* — Michael A Salvitti
(74) *Attorney, Agent, or Firm* — Carl P. Hemenway

(57) ABSTRACT

There is provided a method for making swellable particles, said method comprising mixing initial particles, at least one monomer, at least one initiator, and at least one chain-transfer agent, wherein said mixing is performed under conditions in which said monomer is capable of forming oligomer or polymer or a mixture thereof. Also provided are swellable particles made by that method. Further provided is a method of making polymeric resin particles comprising mixing at least one subsequent monomer to those swellable particles and polymerizing said subsequent monomer.

18 Claims, No Drawings

SWELLABLE PARTICLES

This application claims the benefit of priority under 35 U.S.C. §119(e) of U.S. Provisional Patent Application No. 60/717,955, filed on Sep. 16, 2005, the disclosure of which is incorporated herein by reference.

BACKGROUND

It is often desired to provide particles that are swellable. It is sometimes desired that such swellable particles be relatively large, and it is also sometimes desired that such swellable particle be provided in a collection that has relatively few "fines" (i.e., particles with small diameter relative to the mean particle size of the collection). One use for such swellable particles is in the production of polymeric particles, and the polymeric particles thus produced are useful for one or more of a variety of purposes. Some of such polymeric particles may be chosen or designed to be useful, for example, for one or more of the following purposes: light scattering and/or diffusion materials, surface coatings, surface matting agents, surface gloss reducers, surface texture modifiers, plastic additives, liquid crystal display spacers, standard samples, micro filters, controlled release agents, intermediates for preparation of chromatographic solid phases, adsorbents, solid phase synthesis resins, catalytic enzyme supports, milling media, dispersing media, enzyme immobilization materials, resins for affinity chromatography, or ion-exchange materials.

One method of producing particles is described by Frazza, et. al, in U.S. Pat. No. 5,147,937, which discloses gradually combining a monomer mixture with an aqueous dispersion of emulsion-polymerized polymer particles in the presence of a dispersion stabilizer and an oil-soluble initiator; the resultant particles are disclosed by Frazza, et. al. to be polymer particles. It is desired to provide a method of producing swellable particles. It is also desired to produce swellable particles in a collection that has a relatively large mean particle diameter and has relatively few fines. Additionally, it is desired to produce polymeric resin particles from such swellable particles, so that the collection of polymeric resin particles will also have a relatively large mean particle diameter and/or a relatively small amount of fines.

Further, it is desired to produce such collections of polymeric resin particles using processes that take a relatively short time to perform. Independently, it is additionally desired to produce such collections of polymeric resin particles without the need of uncommon equipment.

In some of the cases, the polymeric resin particles are functionalized. In such cases, it is sometimes desired that the functionalized polymeric resin particles have relatively high capacity for protein molecules. Independently, it is sometimes desired that the functionalized polymeric resin particles be useful for solid phase synthesis of peptides and/or oligonucleotides.

In a first aspect of the present invention, there is provided a method for making swellable particles, said method comprising mixing initial particles, at least one monomer, at least one initiator, and at least one chain-transfer agent, wherein said mixing is performed under conditions in which said monomer is capable of forming oligomer or polymer or a mixture thereof.

In a second aspect of the present invention, there is provided swellable particles made by a method comprising mixing initial particles, at least one monomer, at least one initiator, and at least one chain-transfer agent, wherein said mixing is performed under conditions in which said monomer is capable of forming oligomer or polymer or a mixture thereof.

In a third aspect of the present invention, there is provided polymeric resin particles made by a method comprising mixing at least one subsequent monomer with the swellable particles provided herein in the second aspect of the present invention and polymerizing said subsequent monomer.

In a fourth aspect of the present invention, there is provided functionalized polymeric resin particles made by a method comprising reacting the polymeric resin particles provided herein in the third aspect of the present invention with at least one reagent to chemically bind one or more functional groups to said polymeric resin particles, to convert a chemical group on said polymeric resin particles to a functional group, or a combination thereof.

In a fifth aspect of the present invention, there is provided a method for making swellable particles, said method comprising mixing initial particles, at least one monomer, at least one oil-soluble initiator, and at least one chain-transfer agent, wherein said mixing is performed under conditions in which said monomer is capable of forming oligomer or polymer or a mixture thereof.

In a sixth aspect of the present invention, there is provided a method for making secondary swellable particles, said method comprising mixing
(a) swellable initial particles,
(b) at least one monomer,
(c) at least one oil-soluble initiator, and
(d) at least one chain-transfer agent,
wherein said mixing of said (a), (b), (c), and (d) is performed under conditions in which said monomer (b) is capable of forming oligomer or polymer or a mixture thereof, and wherein said swellable initial particles are made by a method comprising mixing
(d) initial particles,
(e) at least one monomer, wherein any or all of said monomer (e) may be the same as said monomer (b), different from said monomer (b), or a mixture thereof,
(f) at least one initiator, wherein any or all of said initiator (f) may be the same as said initiator (c), different from said initiator (c), or a mixture thereof, and
(g) at least one chain-transfer agent, wherein any or all of said chain-transfer agent (g) may be the same as said chain-transfer agent (d), different from said chain-transfer agent (d), or a mixture thereof,
wherein said mixing of said (d), (e), (f), and (g) is performed under conditions in which said monomer (e) is capable of forming oligomer or polymer or a mixture thereof.

A "polymer," as used herein and as defined by F W Billmeyer, JR. in *Textbook of Polymer Science*, second edition, 1971, is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

"Polymerizing" herein means the reacting of monomers to form oligomer or polymer or a mixture thereof.

Polymer molecular weights can be measured by standard methods such as, for example, size exclusion chromatography or intrinsic viscosity. Generally, polymers have number-average molecular weight (Mn) of 1,000 or more. Polymers may have extremely high Mn; some polymers have Mn above 1,000,000; typical polymers have Mn of 1,000,000 or less. As used herein, "low molecular weight polymer" means a polymer that has Mn of less than 10,000; and "high molecular weight polymer" means a polymer that has Mn of 10,000 or higher. Some polymers are crosslinked, and crosslinked polymers are considered to have infinite molecular weight.

"Oligomers," as used herein, are structures similar to polymers except that oligomers have fewer repeat units and have lower molecular weight. Normally, oligomers have 2 or more repeat units. Generally, oligomers have Mn of 400 or greater and have Mn of less than 2000.

Molecules that can react with each other to form the repeat units of an oligomer or a polymer are known herein as "monomers." Typical monomers have molecular weight of less than 400. Among the monomers useful in the present invention are molecules, for example, that have at least one carbon-carbon double bond. Among such monomers are, for example, vinyl monomers, which are molecules that have at least one vinyl group (i.e., $CH_2=CR-$, where R is a hydrogen, a halogen, an alkyl group, a substituted alkyl group, or another substituted or unsubstituted organic group). Some suitable vinyl monomers include, for example, styrene, substituted styrenes, dienes, ethylene, ethylene derivatives, and mixtures thereof. Ethylene derivatives include, for example, unsubstituted or substituted versions of the following: vinyl acetate, acrylonitrile, (meth)acrylic acids, (meth)acrylates, (meth) acrylamides, vinyl chloride, halogenated alkenes, and mixtures thereof. As used herein, "(meth)acrylic" means acrylic or methacrylic; "(meth)acrylate" means acrylate or methacrylate; and "(meth)acrylamide" means acrylamide or methacrylamide. In some embodiments, "substituted" monomers include, for example, monomers with more than one carbon-carbon double bond, monomers with hydroxyl groups, monomers with other functional groups, and monomers with combinations of functional groups.

In some embodiments, the monomers used do not include vinyl chloride. In some embodiments, the monomers used are all compounds with boiling point at 1 atmosphere pressure of 10° C. or higher.

A substance is said herein to be a "poor solvent for a polymer" if the amount of that polymer that will dissolve in that substance is 1% or less, by weight of polymer based on the weight of the substance. In cases where the polymer of interest is crosslinked, a test polymer can be made that is like the polymer of interest except that the test polymer lacks the functionality that creates the crosslinks; if a substance is a poor solvent for that test polymer, the substance is also considered to be a poor solvent for the polymer of interest. In some cases, a substance is used that is a poor solvent for a certain polymer, where the amount of that polymer that will dissolve in the substance is 0.2% or less; or 0.05% or less; by weight of polymer based on the weight of the substance.

When particles are contemplated to be used in the practice of the present invention, it is sometimes useful to characterize the size of the particles. When particles are spherical or nearly spherical, it is useful to characterize the size by characterizing the diameter of the particles.

When the diameters of a collection of particles have been characterized, it is often apparent that the collection has a distribution of diameters. One characteristic of such distributions is the mean particle diameter. Another characteristic of such distributions is the uniformity of the particle diameters.

It is contemplated that the appropriate technique will be chosen to characterize the diameters of particles of interest, depending on the type and form of particles to be measured. For example, if the particles of interest are dispersed in a transparent medium, light scattering may be used to characterize the diameter, or (if the particles are large enough), optical microscopy may be used. For another example, if the particles are dry, they may be characterized by passing them through a series of sieves of various sizes or by examining them with an electron microscope or with an optical microscope. It is also contemplated that particles of interest that are dispersed could be characterized by drying a sample of such particles and then characterizing that dried sample using a technique appropriate for dry particles.

One method of comparing the amount of fines in two distributions (a "first" distribution and a "second" distribution) of particles is as follows. A dispersion in a fluid is prepared of the first distribution of particles. The dispersion is allowed to stand, or is placed in a centrifuge, with conditions and duration chosen so that some but not all of the particles collect at the bottom of the container in a mass known herein as a "plug." The plug is removed, dried, and weighed. The particles that remain in the dispersion are known to be the smallest particles and are considered "fines." The "% plug" is the dry weight of the plug, as a percentage of the total dry weight of all particles in the original dispersion. The "% fines" is 100 minus the "% plug." Then, a dispersion of the second distribution of particles can be assessed by the identical method. If the second distribution has a lower "% fines" than the first distribution, then it is known that the second distribution has lower amount of fines than the first distribution. This method is normally performed at 25° C.

When particles are dispersed in a fluid, the fluid may be an aqueous fluid or a non-aqueous fluid. The fluid in which particles are dispersed is called the "dispersion medium." Aqueous fluids are defined herein as fluids that contain 50% to 100% water, by weight based on the weight of the fluid. Some aqueous fluids contain water in an amount, by weight based on the weight of the fluid, of 75% to 100%, or 90% to 100%. Non-aqueous fluids are fluids that are not aqueous fluids. When particles are dispersed in a fluid, the dispersion (i.e., the combination of dispersed particles and the fluid in which they are dispersed) may be, for example, a suspension, an emulsion, a miniemulsion, a microemulsion, a latex, or a combination thereof. A dispersion of particles that are dispersed in an aqueous fluid is known herein as an "aqueous dispersion."

As used herein a "micrometer" is one millionth of a meter. Sometimes, in the art, the prefix "micro" is abbreviated with the Greek letter "mu," and a micrometer is sometimes called a "micron."

As used herein, a particle is "swellable" if there can be found a compound that is readily absorbed by the particle, such that the particle is larger after absorbing that compound. If the swellability of the particles is tested, it is contemplated that the size of the swollen particle could be measured by any particle-size test that is appropriate for that type of swollen particle.

The present invention involves a method of making swellable particles, and that method includes mixing particles (known herein as "initial particles") with at least one monomer, at least one initiator, and at least one chain-transfer agent. Herein, this mixture of initial particles, at least one monomer, at least one initiator, and at least one chain-transfer agent, is called the "swellable particle formation mixture" ("SPFM"). In some embodiments, the swellable particle formation mixture optionally contains further ingredients in addition to initial particles, at least one monomer, at least one initiator, and at least one chain-transfer agent.

Initial particles may be any material that is in particulate form. In some embodiments, the initial particles are dispersed in a fluid. In some embodiments, the initial particles are dispersed in an aqueous fluid.

Initial particles may have any composition. In some embodiments, initial particles are organic compounds. In some embodiments, initial particles contain polymer, which may be made by any method, including, for example, bulk, solution, emulsion, dispersion, or suspension polymerization, or by variants or combinations thereof. In some embodiments, initial particles are made by a polymerization method (such as, for example, suspension or emulsion polymerization or a variant or combination thereof) that produces particles that contain polymer; in some cases, such particles are suitable for use as initial particles of the present invention.

Among embodiments in which initial particles are in the form of an aqueous dispersion, the dispersion may be, for example, a suspension, an emulsion, a miniemulsion, a microemulsion, a latex, or a combination thereof.

The initial particles can be produced by any of a wide variety of methods. If the methods of producing the initial particles involves polymerization, that polymerization may be a relatively simple, single-step operation, or the polymerization may be more complex, possibly involving multiple polymerizations. If multiple polymerizations are used, each of the various polymerizations may use the same monomer or monomers as any of the other polymerizations; or may use different monomer or monomers from any of the other polymerizations; or may use a combination of same monomer or monomers as any of the other polymerizations and different monomer or monomers from any of the other polymerizations. If multiple polymerizations are used, they may all be of the same type (for example, emulsion polymerization or suspension polymerization or dispersion polymerization); they may be different types (for example, one or more emulsion polymerizations preceding and/or following one or more suspension polymerizations); or a combination of same-type and different-type polymerizations may be used.

In some embodiments, some or all of the initial particles contain polymer that was made by suspension polymerization. Independently, in some embodiments, some or all of the initial particles contain polymer that was made by dispersion polymerization. Independently, in embodiments, some or all of the initial particles contain high molecular weight polymer.

Independently, in some embodiments, some or all of the initial particles contain polymer or oligomer or a mixture thereof that was made by a method that includes emulsion polymerization. In some of such embodiments, some or all of the polymer in the initial particles is low molecular weight polymer. Independently, in some of such embodiments, the emulsion polymerization includes the use of one or more chain transfer agents.

Independently, in some embodiments, some or all of the initial particles are swellable particles produced by the methods of the present invention. That is, it is contemplated that, in some embodiments, the method of the present invention will be performed on a first set of initial particles to produce swellable particles of the present invention (herein called "swellable initial particles"), which are then used as initial particles in a subsequent performance of the method of the present invention to produce swellable particles (herein called "secondary swellable particles"). In such embodiments, it is contemplated that any or all of the at least one monomer, the at least one chain transfer agent, and the at least one initiator used in making the secondary swellable particles may be the same as, different from, or a mixture thereof, as any or all of the at least one monomer, the at least one chain transfer agent, and the at least one initiator used in making the swellable initial particles. It is further contemplated that, in some embodiments, this process (i.e., using swellable particles as the initial particles in a performance of the method of the present invention to produce swellable particles) could be repeated as many times as desired.

In some embodiments of the present invention, initial particles are used that have mean particle diameter of 0.1 micrometer or more; or 0.2 micrometer or more; or 0.5 micrometer or more. Independently, in some embodiments of the present invention, initial particles are used that have mean particle diameter of 50 micrometers or less; or 25 micrometers or less; or 12 micrometers or less.

In the practice of the present invention, the method of making swellable particles involves mixing initial particles with ingredients that include at least one monomer. In some embodiments, at least one monomer is used that is capable of radical polymerization. In some embodiments, at least one vinyl monomer is used. Independently, in some embodiments, at least one monomer is used that has low solubility in water. In some embodiments, at least one monomer is used that has solubility in water at 25° C., by weight, based on the weight of water, of 1% or less; or 0.5% or less; or 0.2% or less; or 0.1% or less. In some embodiments, all the monomers used in making swellable particles have low solubility in water.

Some useful monomers for making swellable particles are, for example, vinyl aromatic monomers (including, for example, styrene and substituted styrenes), alkyl(meth)acrylates, substituted alkyl(meth)acrylates, and mixtures thereof. Some suitable monomers are alkyl(meth)acrylates with alkyl groups that have 2 or more carbon atoms, or 3 or more carbon atoms, or 4 or more carbon atoms. Independently, some suitable monomers are alkyl(meth)acrylates with alkyl groups that have 25 or fewer carbon atoms, or 12 or fewer carbon atoms, or 8 or fewer carbon atoms. In some embodiments, the monomers used include vinyl aromatic monomers, alkyl acrylates, and mixtures thereof. In some embodiments, the monomers used include at least one alkyl acrylate, the alkyl group of which has 4 to 8 carbon atoms. In some embodiments, the monomers used include butyl acrylate. Independently, in some embodiments, the monomers used include styrene, at least one substituted styrene, or a mixture thereof. In some embodiments, the monomers used include styrene. In some embodiments, the monomers used include a mixture of styrene and butyl acrylate.

In the practice of the present invention, the method of making swellable particles involves the use of at least one chain transfer agent. Chain transfer agents are compounds capable of participating in a chain transfer reaction during radical polymerization of monomer. Some suitable chain transfer agents are, for example, halomethanes, disulfides, thiols (also called mercaptans), and metal complexes. Also suitable as chain transfer agents are various other compounds that have at least one readily abstractable hydrogen atom. Mixtures of suitable chain transfer agents are also suitable. Suitable thiols include, for example, aryl thiols, alkyl thiols, alkyl dithiols, mercaptoalkanols, and alkyl esters of thioalkyl carboxylic acids. Some suitable thiols are, for example, benzene thiol, dodecyl mercaptans, hexanethiol, butanethiol, butyl 3-mercaptopropionate, ethyl 3-mercaptopropionate, butyl mercaptoacetate, 1,6-hexanedithiol, 4-mercapo-2-butanol, 4-mercapto-1-butanol, and 2-mercapto-ethanol. Suitable halomethanes include, for example, chloroform, tetrabromomethane, tetrachloromethane, and bromotrichloromethane. Some suitable disulfides include, for example, dialkyldisulfides (such as, for example diethyldisulfide), dialkylaryldisulfides (such as, for example, dibenzyldisulfide), and diaryldisulfides (such as, for example, diphenyldisulfide).

Mixtures of suitable chain transfer agents are also suitable.

When practicing the process of the present invention for making swellable particles, in some embodiments the amount of chain transfer agent will be, by weight based on the total weight of monomer used in the process of the present invention for making swellable particles, 2% or more; or 5% or more; or 10% or more. In some embodiments the amount of chain transfer agent will be, by weight based on the weight of monomer, 30% or less; or 25% or less.

In the practice of the present invention, the method of making swellable particles involves the use of at least one initiator. An initiator is a compound that is capable of producing at least one free radical under conditions in which that free radical can interact with monomer. Conditions that cause some initiators to produce at least one free radical include, for example, elevated temperature, exposure to photons, exposure to ionizing radiation, reactions of certain compounds (such as, for example, oxidation-reduction pairs of compounds), and combinations thereof.

Some initiators that are suitable for use in the method of the present invention of making swellable particles are water-soluble. As used herein, an initiator is "water-soluble" if it has solubility in water of greater than 1% by weight, based on the weight of water. Some suitable water-soluble initiators are, for example, persulfates, including, for example, sodium persulfate and ammonium persulfate. Some persulfate initiators generate radicals either by being heated or by being reacted with a reductant such as, for example, isoascorbic acid, sodium sulfoxylate formaldehyde, or sodium hydrogensulfite.

Other initiators that are suitable for use in the method of the present invention of making swellable particles are oil-soluble. As used herein, an initiator is "oil-soluble" if it has low solubility in water. Some suitable oil-soluble initiators, for example, have solubility in water, by weight, based on the weight of water, of 1% or less; or 0.1% or less; or 0.01% or less.

Some initiators that are suitable for use in the method of the present invention of making swellable particles are, for example, oil-soluble peroxides and oil-soluble azo compounds. Suitable oil-soluble peroxides include, for example, oil-soluble peroxyesters (also sometimes called percarboxylic esters or peroxycarboxylic esters), oil-soluble peroxydicarbonates, oil-soluble peroxides (such as, for example, oil-soluble dialkyl peroxides, oil-soluble diacyl peroxides, and oil-soluble hydroperoxides), oil-soluble peroxyketals, and oil-soluble ketone peroxides. Peroxyesters have the chemical structure

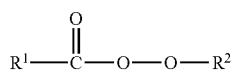

where $R^1$ and $R^2$ are organic groups, which may be the same as each other or different from each other. $R^1$ and $R^2$ may be, independently of each other, straight, branched, cyclic, or a combination thereof. In some embodiments, $R^1$ and $R^2$ may be, independent of each other, alkyl groups, alkenyl groups, aryl groups, substituted versions thereof, or combinations thereof. In some embodiments, $R^1$ is an alkyl group with 4 or more carbon atoms, or an alkyl group with 6 or more carbon atoms. In some embodiments, $R^1$ is an alkyl group with 20 or fewer carbon atoms, or an alkyl group with 10 or fewer carbon atoms. Independently, in some embodiments, $R^2$ is an alkyl group with 1 or more carbon atoms, or an alkyl group with 3 or more carbon atoms. Independently, in some embodiments, $R^2$ is an alkyl group with 10 or fewer carbon atoms, or an alkyl group with 6 or fewer carbon atoms. Suitable initiators include, for example, t-butyl peroctoate. Among suitable oil-soluble diacyl peroxides are, for example, aromatic diacyl peroxides (such as, for example, benzoyl peroxide) and aliphatic diacyl peroxides (such as, for example lauroyl peroxide).

Some azo compounds suitable as oil-soluble initiators are those, for example, with structure $R^3$—N=N—$R^4$, where $R^3$ and $R^4$ are, independently, unsubstituted or substituted organic groups, at least one of which contains a nitrile group. Some examples of such azo compounds are those with the structure

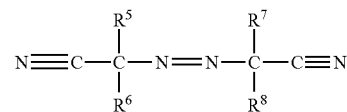

where $R^5$, $R^6$, $R^7$, and $R^8$ are each, independently of each other, a hydrogen or an organic group such as, for example, a methyl group, an ethyl group, an alkyl group with 3 or more carbon atoms, or a substituted version thereof. In some embodiments, $R^5$, $R^6$, $R^7$, and $R^8$ are each, independently of each other, selected from the group consisting of alkyl groups with 1 to 3 carbon atoms. Some suitable initiators include, for example, 2,2'-azobis(2-methylbutanenitrile) and 2,2'-azobis (2,4-dimethylpentanenitrile).

Mixtures of suitable initiators are also suitable.

When practicing the process of the present invention for making swellable particles, in some embodiments the amount of initiator will be, by weight based on the total weight of monomer used in the process of the present invention for making swellable particles, 0.1% or higher, or 0.2% or higher, or 0.5% or higher. In some embodiments the amount of initiator will be, by weight based on the total weight of monomer used in the process of the present invention for making swellable particles, 8% or less, or 4% or less, or 2% or less.

In some embodiments, the swellable particle formation mixture of the present invention optionally further includes one or more stabilizer. Stabilizers are water-soluble polymers such as, for example, poly(vinyl alcohol), cellulose ethers, and mixtures thereof. Suitable cellulose ethers include, for example, cellulose that has been subjected to etherification, in which some or all of the H atoms in the hydroxyl groups are replaced by alkyl groups, hydroxy alkyl groups, alkyl ether groups, or a mixture thereof. In some of the embodiments in which one or more stabilizers are used in the process of the present invention for making swellable particles, the amount of stabilizer is, by weight of stabilizer, based on the dry weight of initial particles, 1% or more; or 2% or more. Independently, in some of the embodiments in which one or more stabilizers are used in the process of the present invention for making swellable particles, the amount of stabilizer is, by weight of stabilizer, based on the dry weight of initial particles, 15% or less; or 7% or less. In some embodiments, no stabilizer is used in the process of the present invention for making swellable particles.

In the process of the present invention of making swellable particles, the mixing of the ingredients may be performed by any method, in any order, as long as the process involves, at some time, a mixture that includes (optionally, among other ingredients) initial particles, monomer, chain-transfer agent, and initiator, is present under conditions in which the monomer is capable of polymerizing. It is contemplated that, in some embodiments, the ingredients may be mixed continuously as they flow through a continuous-flow reactor. It is also contemplated that, in some embodiments, some of the ingredients may be placed in a vessel and the other ingredients may be added (together or individually; gradually or suddenly) to that vessel.

As used herein "conditions in which monomer is capable of forming oligomer or polymer or a mixture thereof" means conditions in which polymerization can proceed usefully quickly. To test if a particular set of conditions are "conditions in which monomer is capable of forming oligomer or polymer or a mixture thereof", the conditions could be held constant, without adding or removing any ingredients, and the amount of monomer present could be measured. Under "conditions in which monomer is capable of forming oligomer or polymer or a mixture thereof," after conditions are held constant for one hour, 5% or more of the monomer (by weight, based on the weight of monomer present at the beginning of the one hour period) will have reacted to form oligomer or polymer or a mixture thereof. In some cases, 10% or more, or 20% or more, or 50% or more of the monomer will have reacted to form oligomer or polymer or a mixture thereof.

Polymerizing in the practice the method of the present invention for making swellable particles is conducted by providing conditions in which the monomers can and do react to form at least one oligomer or polymer or mixture thereof. In some embodiments, the amount of monomer consumed in the formation of polymer is 90% or more; or 95% or more; or 99% or more, by weight of monomer consumed, based on the total weight of monomer used in the process of making swellable particles.

In some embodiments (herein called "addition to aqueous initial particle embodiments" or "AAIP embodiments"), some or all of the initial particles are in the form of an aqueous dispersion; these initial particles are placed in a vessel; and the "SPFM remaining ingredients" (i.e., all the ingredients of the swellable particle formation mixture other than the initial particles) are then added to that vessel. In AAIP embodiments, the SPFM remaining ingredients may be added individually to the vessel containing initial particles; or some or all of the SPFM remaining ingredients may be mixed together before the mixture is added to the vessel containing initial particles; or some combination of individual SPFM remaining ingredients and mixtures of SPFM remaining ingredients may be added to the vessel containing initial particles. Among AAIP embodiments in which not all the SPFM remaining ingredients are mixed together prior to adding them to the vessel, it is contemplated that, in some embodiments, any SPFM remaining ingredients that are not mixed together may be added separately and simultaneously to the vessel containing initial particles.

Independently, in some AAIP embodiments, one or more of the SPFM remaining ingredients are in the form of an aqueous dispersion prior to being added to the vessel containing initial particles. When such an aqueous dispersion is formed, any method of forming a dispersion may be used. For example, one or more SPFM remaining ingredients may be mixed with water and one or more surfactants. If the one or more SPFM remaining ingredients are liquids, the resulting dispersion is commonly called an emulsion. Such aqueous dispersions are often made by methods that include mixing the mixture of one or more SPFM remaining ingredients with one or more surfactants in the presence of mechanical agitation. In some embodiments, the mechanical agitation provides "high shear" (i.e., it imparts a high shear rate to the ingredients).

When an aqueous dispersion is formed using mechanical agitation, the mechanical agitation may be supplied by any method that results in an aqueous dispersion. Some suitable mechanical agitation methods include, for example, shaking the mixture, stirring the mixture, or passing the mixture through a static mixing element. Suitable stirring methods include, for example, contacting the mixture with a rotating device such as, for example, a magnetic bar or an impeller. One suitable arrangement of a rotating device, for example, is to fix the rotating device in a pipe or other conduit and pass the mixture continuously through the pipe or other conduit, past the rotating device. Another suitable arrangement of a rotating device, for example, is to place a fixed volume of mixture and the rotating device into a container and rotate the rotating device within the fixed volume of mixture until a dispersion is formed.

Some suitable impellers include, for example, axial flow impellers (including, for example, propellers and pitched blade turbines), radial flow impellers (including, for example, open flat blade impellers, disk style impellers, backswept open impellers, and backswept with disk impellers), hydrofoil impellers, high shear impellers (including, for example, bar turbines, sawtooth impellers, and rotor/stators), and close-clearance impellers (including, for example, anchor impellers, helical ribbons, and wall scrapers). Sometimes, the process of forming a dispersion using a high shear impeller is referred to as "homogenizing."

In some of the embodiments in which at least one ingredient other that the initial particles is in the form of an aqueous dispersion, the dispersion of that ingredient may be stabilized with one or more dispersant or surfactant or mixture thereof. When a dispersant or surfactant is used, it is desirably chosen to be compatible with any other aqueous dispersions that are used in the practice of the present invention. Suitable surfactants include, for example, cationic surfactants, nonionic surfactants, amphoteric surfactants, and anionic surfactants. Among the suitable nonionic surfactants are, for example, alkyl ether polymers (including block polymers) and alkyl phenol polyalkyloxylates (such as, for example, alkyl phenol polyethoxylates). Among the suitable anionic surfactants are, for example, carboxylate surfactants, sulfonate surfactants, sulfate surfactants, and phosphate surfactants. Some suitable anionic surfactants are, for example, alkyl carboxylates, alkenyl carboxylates, alkylbenzene sulfonates, alkyl sulfates, and alkyl phosphates. In some embodiments, alkylbenzene sulfonates or alkyl sulfates or mixtures thereof are used. In some embodiments, alkylbenzene sulfonates are used. Mixtures of suitable surfactants are also suitable.

When an ingredient or mixture of ingredients is in the form of an aqueous emulsion, the amount of surfactant used in some embodiments, by weight of surfactant based on total weight of the ingredient or ingredients in the emulsion, is 0.05% or more; or 0.1% or more. Independently, in some embodiments the amount of surfactant used, by weight of surfactant based on total weight of the ingredient or ingredients in the emulsion, is 10% or less; or 5% or less.

In the process of the present invention for making swellable particles, the ingredients are mixed under conditions in which the monomer is capable of polymerizing. In some embodiments, such conditions are established when the conditions necessary for the initiator to form free radicals are present. For example, in such embodiments, when an initiator is used that produces free radicals when the temperature is high enough, it is contemplated that the ingredients will be mixed at a temperature high enough so that the initiator produces enough free radicals so that the monomer in the mixture is capable of polymerizing. It is further contemplated that the conditions under which mixing takes place will also provide other aspects that may be necessary for polymerization to occur, such as, for example, sufficient agitation to ensure mixing, and, for another example, transport conditions that allow free radicals and monomer molecules to react.

In some embodiments of the present invention, one or more materials may or may not be mixed with some or all of the initial particles prior to formation of the swellable particle formation mixture. For example, in embodiments in which initial particles are used in the form of a dispersion, it is useful to consider substances herein called "swellants," which are compounds that are more compatible with the initial particles than with the dispersion medium, that have relatively low molecular weight, and that are not monomers. Some swellants have solubility in the dispersion medium of the initial particles, by weight, based the weight of the dispersion medium, of 5% or less, or 2% or less, or 1% or less. Independently, some swellants have molecular weight of 1,000 or lower; or 500 or lower. Common swellants are, for example, plasticizers, solvents, or mixtures thereof.

In some embodiments, prior to formation of the complete swellable particle formation mixture, the amount of plasticizer present in any mixture with initial particles, by weight, based on the total dry weight of initial particles, is 10% or less; or 3% or less; or 1% or less; 0.3% or less; or 0.1% or less; or none. Independently, in some embodiments, prior to formation of the complete swellable particle formation mixture, the amount of solvent present in any mixture with initial particles, by weight, based on the total dry weight of initial particles, is 10% or less; or 3% or less; or 1% or less; 0.3% or less; or 0.1% or less; or none. Independently, in some embodiments, prior to formation of the complete swellable particle formation mixture, the amount of any swellant present in any mixture with initial particles, by weight, based on the total dry weight of initial particles, is 10% or less; or 3% or less; or 1% or less; 0.3% or less; or 0.1% or less; or none.

In the practice of the method of the present invention for forming swellable particles, in some embodiments, some monomer may or may not be mixed with some or all of the initial particles prior to formation of the complete swellable particle formation mixture. In some embodiments, prior to formation of the complete swellable particle formation mixture, the amount of monomer present in any mixture with initial particles, by weight, based on the total dry weight of initial particles, is 10% or less; or 3% or less; or 1% or less; 0.3% or less; or 0.1% or less; or none.

In the practice of the method of the present invention for forming swellable particles, in some embodiments, some chain-transfer agent may or may not be mixed with some or all of the initial particles prior to formation of the complete swellable particle formation mixture. In some embodiments, prior to formation of the complete swellable particle formation mixture, the amount of chain-transfer agent present in any mixture with initial particles, by weight, based on the total dry weight of initial particles, is 10% or less; or 3% or less; or 1% or less; 0.3% or less; or 0.1% or less; or none.

In the practice of the method of the present invention for forming swellable particles, in some embodiments, it is possible to have some initiator mixed with some or all of the initial particles prior to formation of the complete swellable particle formation mixture. In other embodiments, no initiator is mixed with any of the initial particles prior to formation of the complete swellable particle formation mixture.

In the practice of the method of the present invention for forming swellable particles, in some embodiments, it is possible to have some monomer mixed with some or all of the initial particles prior to formation of the complete swellable particle formation mixture. In other embodiments, no monomer is mixed with any of the initial particles prior to formation of the complete swellable particle formation mixture.

Various methods are contemplated in the practice of the method of the present invention for forming swellable particles. In some embodiments, some or all of the initial particles are mixed with one, two, or all three of some of the monomer, some of the chain transfer agent, and some of the initiator, prior to establishing conditions in which the monomer is capable of polymerizing. In such embodiments, it is contemplated that the remaining portion (or entire portion) of each of the chain transfer agent, monomer, and initiator is mixed with the initial particles under conditions in which the monomer is capable of polymerizing. Also contemplated are embodiments in which the swellable particle formation mixture is first formed and the conditions in which the monomer is capable of polymerizing are first established when the first portion of monomer, the first portion of chain transfer agent, and the first portion of initiator are all simultaneously (and, optionally, separately) added to the initial particles.

The swellable particles of the present invention, after they are made, may or may not contain swellant. In some embodiments, the amount of swellant present in the swellable particles of the present invention is, by weight, based on the total dry weight of the swellable particles, 10% or less; or 3% or less; or 1% or less; 0.3% or less; or 0.1% or less; or none.

While the present invention is not limited to any particular mechanism, it is contemplated that, in some embodiments, while the method of the present invention for making swellable particles is being performed, some or all of at least one monomer that is mixed with initial particles follows the following steps: such monomer becomes resident on or in the initial particles, possibly causing the initial particles to swell; such monomer then encounters one or more free radicals (presumably formed from one or more initiators) that are also resident on or in the initial particles; and such monomer then participates with other such monomer or monomers in a polymerization reaction. For example, in some AAIP embodiments, at least one monomer and at least one initiator are added gradually and simultaneously (either together in a single mixture, or simultaneously but separately); in such AAIP embodiments, it is contemplated that some monomer enters the initial particles and polymerizes there, as further monomer is gradually added to the vessel. In some of such AAIP embodiments, at least one oil-soluble initiator is used.

In some embodiments of the present invention, the mean particle diameter of the swellable particles is larger than the mean particle diameter of the initial particles. In some embodiments, the mean particle diameter of the swellable particles of the present invention is larger than the mean particle diameter of the initial particles by a factor of 1.5 times or higher; or 2 times or higher; or 4 times or higher. Independently, in some embodiments, the swellable particles have mean particle diameter of 0.25 micrometer or more; or 0.5 micrometer or more; or 1 micrometer or more; or 2 micrometers or more; or 4 micrometers or more; or 8 micrometer or more. Independently, in some embodiments of the present invention, swellable particles have mean particle diameter of 100 micrometers or less; or 50 micrometers or less; or 25 micrometers or less.

In some embodiments, the swellable particles of the present invention contain oligomer or low molecular weight polymer or a mixture thereof. In some embodiments, the material formed during the method of the present invention for making swellable particles contains oligomer or low molecular weight polymer or a mixture thereof.

One advantage of the method of the present invention for making swellable particles is that the method can be performed in a reasonable duration. The duration of the method is the period from the time the SPFM is first formed until the time at which all of the intended monomer has been added and the polymerization of that monomer is at least 90% complete. By "% complete" is meant herein the weight of unreacted monomer (i.e., monomer that has not been incorporated into an oligomer or polymer molecule) based on the weight of all the monomer added during the performance of the method for making swellable particles. In some embodiments, the end of the duration of the method is marked when the polymerization of monomer is at least 95% complete, or at least 99% complete. In some embodiments, the duration of the method is 24 hours or less; or 12 hours or less; or 8 hours or less.

One use for the swellable particles of the present invention is as an ingredient in making polymeric resin particles. When the swellable particles of the present invention are used in making polymeric resin particles, the method of making such polymeric resin particles includes, among other steps, mixing the swellable particles of the present invention with at least one monomer (herein called "subsequent monomer" to distinguish it from monomer used in making the swellable particles). Each of the subsequent monomer or monomers may independently be the same as or different from any or all of the monomer or monomers used in making the swellable particles. The method of making such polymeric resin particles further includes polymerizing the at least one subsequent monomer.

Polymerizing in the practice of the method of the present invention for making polymeric resin is conducted by providing conditions in which the subsequent monomers can and do react to form at least one oligomer or polymer or mixture thereof. In some embodiments, the amount of monomer consumed in the formation of polymer is 90% or more; or 95% or more; or 99% or more, by weight of monomer consumed, based on the total weight of subsequent monomer used in the process of making polymeric resin. The subsequent monomer or monomers may be mixed with the swellable particles before the start of the polymerization, during the polymerization, or a combination thereof. In some embodiments, exactly one step of mixing swellable particles with subsequent monomer and exactly one step of polymerizing the subsequent monomer will be performed. In some embodiments, more than one of such mixing step may be performed, and, independently, in some embodiments, more than one polymerizing step may be performed. In some embodiments, after a first portion of subsequent monomer is mixed with swellable particles and polymerized, the resulting composition may be mixed with one or more further portions of subsequent monomer (each of which may independently be the same as or different from monomers included in previous portions of subsequent monomer), which would then be polymerized.

In some embodiments, the polymeric resin particles contain high molecular weight polymer or crosslinked polymer or a mixture thereof. In some embodiments, the polymer made by polymerizing the at least one subsequent monomer contains a high molecular weight polymer or a crosslinked polymer or a mixture thereof. One useful method of observing the presence of crosslinked polymer is to test the solubility of the polymer of interest; crosslinked polymers are generally not soluble in any solvent. In many samples of polymeric resin particles, the amount of polymer that is crosslinked is characterized by the portion of the polymeric resin particles that is not soluble. In some embodiments, polymeric resin particles made by polymerizing the at least one subsequent monomer contains an amount of material that is not soluble, by dry weight, based on the dry weight of polymeric resin particles, of 50% or more; or 75% or more; or 90% or more.

Some monomers suitable as subsequent monomer in the practice of the present invention include, for example, vinyl monomers. Suitable vinyl monomers include those with a single vinyl group, those with multiple vinyl groups, and mixtures thereof. Some suitable vinyl monomers include, for example, vinyl carboxylates, vinyl urethane monomers, vinyl aromatic monomers, (meth)acrylate esters, substituted (meth)acrylate esters, and mixtures thereof. One example of a vinyl carboxylate is vinyl acetate. One example of a vinyl urethane monomer is triallyl isocyanurate. Examples of suitable vinyl aromatic monomers include styrene, divinyl benzene, and substituted versions thereof (such as, for example, alpha-methyl styrene). Some suitable substituted (meth)acrylate esters include, for example, esters of polyhydric alcohols with (meth)acrylic acid, such as, for example, ethylene glycol dimethacrylate, glycerol dimethacrylate, and mixtures thereof.

Further examples of vinyl monomers suitable as subsequent monomers are alkyl esters of (meth)acrylic acid where the alkyl group has a functional group. In some cases, such a functional group is capable of reacting with other groups (which may be the same as or different from the functional group), either during or after polymerization of the subsequent monomer. In some of such cases, the reacting of the functional group with other groups creates branch points or crosslink junctions in the polymer that results from polymerizing the subsequent monomer. One example of such a functional group is the glycidyl group. One example of this type of monomer is glycidyl methacrylate.

Mixtures of monomers suitable as subsequent monomers are also suitable as subsequent monomers.

In some embodiments, polymeric resin particles have mean particle diameter of 1 micrometer or more; or 3 micrometer or more; or 10 micrometer or more. Independently, in some embodiments of the present invention, polymeric resin particles have mean particle diameter of 1000 micrometers or less; or 600 micrometers or less; or 250 micrometers or less; or 100 micrometers or less.

In some embodiments of the method of the present invention for making polymeric resin particles, no chain transfer agent is used beyond whatever chain transfer agent was used in the formation of the swellable particles.

When the swellable particles of the present invention are present as an aqueous dispersion, some embodiments of the method of the present invention of making polymeric resin particles involve mixing subsequent monomer with the aqueous dispersion and polymerizing the subsequent monomer in the mixture so formed. Such embodiments are known herein as "DSP" embodiments.

In some DSP embodiments, polymerizing of subsequent monomer may be performed using, for example, emulsion polymerization, suspension polymerization, dispersion polymerization, or a combination thereof. Independently, in some DSP embodiments, one or more subsequent monomers is formed into an aqueous emulsion, which is then added to the aqueous dispersion of swellable particles.

In some DSP embodiments, various optional ingredients may or may not be included in the mixture of aqueous dispersion of swellable particles and subsequent monomer. Such optional ingredients may be added, for example, to aid in conducting the polymerizing of subsequent monomer or to affect the properties of the finished polymeric resin particles. Such optional ingredients may be added before, during, or after the mixing of aqueous dispersion of swellable particles with subsequent monomer. Optional ingredients include, for example, one or more of initiators, stabilizers, porogens, other compounds, and mixtures thereof.

When one or more initiators are used in a DSP embodiment, the same initiator or initiators are suitable for polymerizing subsequent monomer as the initiators described herein above as suitable for use in the process of the present invention for making swellable particles. When one or more initiators are used in a DSP embodiment, each of the initiator or initiators used may independently be the same or different from any of the initiator or initiators used in making the swellable particles.

When practicing the process of the present invention for making polymeric resin particles, in some embodiments the amount of initiator will be, by weight based on the total weight of subsequent monomer used, 0.1% or higher, or 0.2% or higher, or 0.5% or higher. In some embodiments the amount of initiator will be, by weight based on the total weight of subsequent monomer used, 8% or less, or 4% or less, or 2% or less.

Some DSP embodiments involve the use of one or more stabilizers, while some DSP embodiments do not involve the use of stabilizers. Compounds described herein above as suitable as stabilizers in the method of the present invention for making swellable particles are also suitable as stabilizers in the method of the present invention for making polymeric resin particles. Among those embodiments in which a swellable particle that was made using one or more stabilizers is used in making polymeric resin particles that are made using a method that includes the use of one or more stabilizers, any of the stabilizers used in making the polymeric resin particles may independently be the same as or different from any of the stabilizers that were used in making the swellable particles. When one or more stabilizers are used in making polymeric resin particles, in some embodiments the amount of stabilizer, by weight based on the dry weight of swellable particles, is 1% or more; or 2% or more; or 4% or more. When one or more stabilizers are used in making polymeric resin particles, in some embodiments the amount of stabilizer, by weight based on the dry weight of polymeric resin particles, is 50% or less; or 30% or less.

Some DSP embodiments involve the use of one or more porogens. Porogens are compounds that are not monomers; that are more soluble in one or more subsequent monomer than in water; and that are poor solvents for the polymer formed by polymerizing the subsequent monomer or monomers. Some suitable porogens are, for example, hydrocarbons, alcohols, ethers, ketones, and esters. The hydrocarbon portion of suitable porogen molecules may be linear, branched, cyclic, or a combination thereof. Some suitable hydrocarbon porogens are aliphatic hydrocarbons such as, for example, iso-octane. Further suitable hydrocarbon porogens are aromatic-containing hydrocarbons such as, for example, xylene or toluene. Some suitable ester porogens are, for example, esters of aromatic carboxylic acids, such as, for example, dialkyl phthalates. Further suitable ester porogens are, for example, esters of aliphatic carboxylic acids, such as, for example, butyl acetate. Some suitable ether porogens include, for example, dialkyl ether porogens with alkyl groups having 3 or more carbon atoms, such as, for example, dibutyl ether. Some suitable alcohol porogens are, for example, alcohols of linear, branched, or cyclic alkyls with 5 or more carbon atoms, including, for example, cyclohexanol or 4-methyl-2-pentanol. Some suitable ketone porogens are, for example, dialkyl ketones such as, for example, methyl isobutyl ketone. Mixtures of suitable porogens are also suitable.

In some embodiments of the process of the present invention for making polymeric resin particles, the ratio of the weight of porogen to the total weight of all subsequent monomer is 0.1 or higher; or 0.25 or higher; or 0.5 or higher. In some embodiments of the process of the present invention for making polymeric resin particles, the ratio of the weight of porogen to the total weight of all subsequent monomer is 10 or lower; or 5 or lower; or 2.5 or lower.

In the process of the present invention for making polymeric resin particles, in some embodiments, one or more ingredients (either one or more subsequent monomer or one or more optional ingredients or a combination thereof) may be used in the form of an aqueous emulsion.

When one or more ingredients in the method of the present invention for making polymeric resin particles is in the form of an emulsion, the suitable dispersants and surfactants (and their amounts) are the same as those discussed herein above as suitable for use in emulsion of ingredients used in the method of the present invention for making swellable particles. Any dispersant or surfactant used in the method of the present invention for making polymeric resin particles may independently be the same as or different from any dispersant or surfactant that was used in making the swellable particles. If more than one ingredient in the making of the polymeric resin particles is in the form of an emulsion, the ingredients may be mixed together in a single emulsion, or they may be in different emulsions, or any combination thereof. If more than one emulsion of ingredients is used in the method of the present invention for making polymeric resin particles, the dispersants or surfactants may be the same or different or any combination thereof in the emulsions. Suitable anionic surfactants include, for example, sulfonate surfactants such as, for example, dialkyl sulfosuccinate surfactants.

The polymeric resin particles of the present invention may be used with or without being functionalized. "Functionalized" herein means that the polymeric resin particles are reacted with at least one reagent to chemically bind one or more functional groups (such as, for example, ions) to the polymeric resin particles or to convert a chemical group on the polymeric resin particle (such as, for example, an ester group) to a functional group (such as, for example, a carboxyl group). Functionalized polymeric resin particles are often useful as ion-exchange resins. Polymeric resin particles of the present invention may be functionalized to form, for example, strong cation exchange resins, strong anion exchange resins, weak cation exchange resins, weak anion exchange resins, other functionalized resins, and combinations and mixtures thereof. In some embodiments, polymeric resin particles of the present invention are formed into strong cation exchange resins by reacting the polymeric resin particles with one or more sulfonating agent (such as, for example, sodium dithionite or sodium sulfite). In some embodiments, polymeric resin particles of the present invention are formed into strong anion exchange resins by reacting the resins with one or more amine compound, such as, for example, trimethylammonium chloride. In some embodiments, polymeric resin particles of the present invention are formed into weak anion exchange resins by reacting the polymeric resin particles with one or more amine compound, such as, for example, diethylamine hydrochloride. In some embodiments, polymeric resin particles of the present invention are formed into weak cation exchange resins by, for example, reacting the polymeric resin particles with sodium hydroxide to hydrolyze ester groups on the polymeric resin particles to carboxyl groups.

Some functionalized polymeric resin particles of the present invention have good capacity and recovery when used with proteins, as measured, for example, using the methods described herein in Example 35. Independently, some functionalized resin particles of the present invention have good performance when salt, such as, for example, sodium chloride is present; that is, such resin particles have good capacity and recovery when used with proteins in the presence of relatively high levels of salt. Examples of measurements of capacity and recovery in the presence of salt are described herein in Example 35.

Independently, some functionalized polymeric resin particles of the present invention have good rigidity, as measured, for example, by the method described herein in Example 42.

Some of the polymeric resin particles of the present invention are useful for purifying biomolecules (such as, for example, proteins, enzymes, and other biomolecules). Such purifying is sometimes performed by contacting the polymeric resin particles with an aqueous solution of mixed biomolecules, for example by placing the polymeric resin particles in a liquid chromatography column and passing the aqueous solution through the column.

Some of the functionalized polymeric resin particles of the present invention are useful for purifying biomolecules (such as, for example, proteins, enzymes, and other biomolecules). Such purifying is sometimes performed by contacting the functionalized polymeric resin particles with an aqueous solution of mixed biomolecules, for example by placing the functionalized polymeric resin particles in a liquid chromatography column and passing the aqueous solution through the column.

An advantage to some of the methods of the present invention is that they can be conducted at reasonable levels of productivity. That is, in some embodiments, the methods of the present invention use commercially useful methods of polymerization (such as, for example, emulsion, suspension, and dispersion polymerization, and combinations thereof), and the practitioner of the methods of the present invention can produce swellable particles or polymeric resin particles or both, with resulting levels of productivity that are normal for such commercially useful processes. For example, the methods of the present invention can be practiced on a large scale. That is, a relatively large vessel could be used to produce a relatively large batch of material. It is contemplated that in some embodiments, a batch of swellable particles could be made that is 10 liters or larger; or 100 liters or larger; or 1,000 liters or larger. Independently, it is contemplated that in some embodiments, a batch of polymeric resin particles could be made that is 10 liters or larger; or 100 liters or larger; or 1,000 liters or larger. Independently, it is contemplated that in some embodiments, a batch of swellable particles could be made that has 3 kg or more of swellable particles by dry weight; or 30 kg or more; or 300 kg or more. Independently, it is contemplated that in some embodiments, a batch of polymeric resin particles could be made that has 5 kg or more of swellable particles by dry weight; or 50 kg or more; or 500 kg or more.

Independently, an advantage to some of the methods of the present invention is that they can be performed using normal commercial equipment for polymerization. In some embodiments, the methods of the present invention may be performed without the use of unusual equipment such as, for example, jets or frits.

Another independent advantage of some of the methods of the present invention for making polymeric resin particles is that these methods can be performed in a reasonable duration. The duration of the method is the period from the time any subsequent monomer is mixed with any swellable particles until the time at which all of the intended subsequent monomer has been added and the polymerization of that monomer is at least 90% complete. By "% complete" is meant herein the weight of unreacted monomer (i.e., monomer that has not been incorporated into an oligomer or polymer molecule) based on the weight of all the monomer added during the performance of the method for making swellable particles. In some embodiments, the end of the duration of the method is marked when the polymerization of subsequent monomer is at least 95% complete, or at least 99% complete. In some embodiments, the duration of the method for making polymeric resin particles is 48 hours or less; or 36 hours or less; or 24 hours or less; or 18 hours or less.

In some embodiments of the method of the present invention for making polymeric resin particles, swellable particles of the present invention are mixed with subsequent monomer, a period of time (known herein as the "swell time") is allowed to elapse before polymerization takes place, and then the conditions in which the subsequent monomer polymerizes are established. In some of such embodiments, the swell time is 12 hours or less, or 10 hours or less, or 8 hours or less, 6 hours or less, or 2 hours or less.

It is considered an advantage of some of the methods of the present invention for making polymeric resins that swell times are generally lower in the method of the present invention than swell times of previously known methods for making polymeric resins. This advantage is especially observed when resins of the present invention are compared with resins made by previously known methods using similar monomers, and when the ratio of seed to final resin in the previously known method is similar to the ratio of swellable particle to final resin in the method of the present invention.

EXAMPLES

The following terms and abbreviations are used in the following Examples. "DI Water" is deionized water. "pbw" is parts by weight. "BA" is n-butyl acrylate. "SDBS" is sodium dodecylbenzenesulfonate. "BI-90" is a particle size analysis instrument by Brookhaven Instruments, model BI-90. "MPS" is mean particle size. "Conc." is concentration in solution, by weight, based on the total weight of the solution. "SDOSS" is Sodium Dioctyl Sulfosuccinate. SDOSS solutions were prepared from Solusol™ 75 from Cytec Industries, a solution of SDOSS in a mixture of ethanol and water, 73-75% conc.; SDOSS "aqueous solutions" were prepared by dilution of SOluSol™ 75 with water to give the "conc." reported herein, which was concentration of SDOSS based on the total weight of the solution. "Triton™ X-405" is a nonionic surfactant from Dow Chemical Company, supplied and used as an aqueous solution of conc. 70%. "AMPN" is 2,2'-Azobis(2-methylpropionitrile). A "reactor" is a vessel that is equipped with a stirrer and a condenser; the materials inside the vessel are blanketed with nitrogen gas. Mixtures are "emulsified" by blending in a high intensity mixer to form a homogeneous emulsion, using a Type X520 homogenizer from Ingeniuburo CAT, M. Zipperer GMBLT. "Metolose™ 400 90SH" stabilizer is a nonionic water-soluble cellulose ether in which some or all of the hydrogen atoms in the cellulose hydroxyl groups have been replaced by methyl groups, available from ShinEtsu Chemical Co., Ltd. "GMA" is glycidyl methacrylate. "EGDMA" is ethylene glycol dimethacrylate. "DVB" is divinylbenzene. "Solids" herein means the amount of solid material in an emulsion, suspension, or dispersion, by weight, based on the total weight of that emulsion, suspension, or dispersion. "TFA" is trifluoroacetic acid. "pI" is the pH at which a protein is neutral.

Example 1

Preparation of Particles

A reactor was charged with Mixture A (140 pbw of DI water; and 0.4 pbw of sodium carbonate) and heated to 83° C. To the reactor contents were added 10% of emulsified Mixture B (99.8 pbw of BA; 0.2 pbw of ALMA; 5.91 pbw of an aqueous solution of SDBS, 10.16% conc.; 27.3 pbw of DI water) and 25% of Mixture C (0.053 pbw of sodium persulfate; and 61.6 pbw of DI water). The temperature was maintained at 83° C. and the mixture was stirred for 60 minutes, after which the remaining Mixture B and Mixture C were added to the reactor with stirring over a period of 240 minutes. Stirring was continued at 83° C. for 30 minutes, after which the reactor contents were cooled to room temperature. Resulting MPS was 0.26 micrometer as measured by BI-90.

Example 2

Preparation of Particles

A reactor was charged with Mixture A (151 pbw of DI water; and 0.40 pbw of sodium carbonate) and heated to 83° C. To the reactor contents was added 10% of emulsified Mixture B (100 pbw of BA; 4.98 pbw of aqueous solution of SDBS, 10.05% conc., and 27.6 pbw of DI water) and 25% of Mixture C (0.053 pbw of sodium persulfate; and 49.9 pbw of DI water). The temperature was maintained at 83° C. and the mixture was stirred for 60 minutes, after which the remaining Mixture B and Mixture C were added to the reactor with stirring over a period of 180 minutes. Stirring was continued at 83° C. for 30 minutes, after which the reactor contents were cooled to room temperature. The Resulting MPS was 0.24 micrometer as measured by BI-90.

Example 3

Preparation of Particles

The components (90 pbw of styrene; 2.1 pbw of AMPN; 280 pbw of ethanol; 232 pbw of methoxyethanol; and 10.5 pbw of polyvinylpyrrolidone, weight-average molecular weight 40,000) were stirred in a beaker until the solution was clear. The solution was then transferred to a reaction kettle, which was then sparged with nitrogen for about 30 minutes, heated to 70° C. over 40 minutes, and held at 70° C. for 24 hrs. After being cooled down to room temperature, the mixture was centrifuged, and the solvent was removed by decanting. The particles were redispersed into an aqueous solution of sodium lauryl sulfate (0.25% conc.) to form a suspension of 20% solid weight of polystyrene, based on the total weight of the suspension. The resulting particles had MPS of 1.77 micrometers as measured by Coulter Counter.

Example 4

Preparation of Particles

The components (90 pbw of styrene; 2.1 pbw of AMPN; 280 pbw of ethanol; 232 pbw of methoxyethanol; and 10.5 pbw of polyvinylpyrrolidone, weight-average molecular weight 55,000) were stirred in a beaker until the solution was clear. The solution was then transferred to a reaction kettle, which was then sparged with nitrogen for about 30 minutes, heated to 70° C. over 40 minutes, and held at 70° C. for 24 hrs. After being cooled down to room temperature, the mixture was centrifuged, and the solvent was removed by decanting. The particle was redispersed into an aqueous solution of sodium lauryl sulfate (0.25% conc.) to form a suspension of 20% solid weight of polystyrene, based on the total weight of the suspension. The resulting particles had MPS of 3.0 micrometers as measured by Coulter Counter

Example 5

Preparation of Swellable Particles

Mixture A (0.08 pbw of sodium carbonate; 0.01 pbw of aqueous solution of SDBS, 9.76% conc.; and 156 pbw of DI water) was added to a reactor and heated to 88° C. with stirring. The air in the reactor was replaced by nitrogen. When the reactor temperature stabilized at 88° C., Mixture B (30.85 pbw of the aqueous emulsion from Example 1, 32.4% solids) was charged into the reactor. Emulsified Mixtures C (81.8 pbw of BA; 18.2 pbw of styrene; 4.53 pbw of aqueous solution of SDBS, 9.76% conc.; and 57.5 pbw of DI water) and D (18.8 pbw of 1-hexanethiol; 0.58 pbw of aqueous solution of SDBS, 9.76% conc.; and 15 pbw of DI water), and Mixture E (0.11 pbw of sodium persulfate; and 47.4 pbw of DI water) were then added to the reactor, with stirring, over a period of 330 minutes. Stirring was continued at 88° C. for 30 minutes, after which the reactor contents were cooled to room temperature. The resulting MPS was 0.63 micrometer as measured by BI-90.

Example 6

Preparation of Swellable Particles

Mixture A (0.08 pbw of sodium carbonate; 0.01 pbw of aqueous solution of SDBS, 10.05% conc.; and 156 pbw of DI water) was added to a reactor and heated to 88° C. with stirring. The air in the reactor was replaced by nitrogen. When the reactor temperature stabilized at 88° C., Mixture B (33.03 pbw of the aqueous emulsion from Example 2, 30.3% solids) was charged into the reactor. Emulsified Mixtures C (81.8 pbw of BA; 18.2 pbw of styrene; 4.4 pbw of aqueous solution of SDBS, 10.05% conc.; and 57.5 pbw of DI water) and D (18.8 pbw of 1-hexanethiol; 0.56 pbw of aqueous solution of SDBS, 10.05% conc.; and 21.3 pbw of DI water), and Mixture E (0.11 pbw of sodium persulfate; and 43.6 pbw of DI water) were then added to the reactor, with stirring, over a period of 300 minutes. Stirring was continued at 88° C. for 30 minutes, after which the reactor contents were cooled to room temperature. The resulting MPS was 0.53 micrometer as measured by a Brookhaven Instruments particle size analyzer BI-90.

Example 6R

Repeat of Example 6

The procedure of Example 6 was repeated. The resulting emulsion had MPS of 0.55 micrometer and had 29.72% solids.

Example 7

Preparation of Swellable Particles

A reactor was charged with Mixtures A (1 pbw of Triton™ X-405; and 108 pbw of DI water) and B (2.171 pbw of the aqueous emulsion produced in Example 6R, and heated to 87° C. Mixtures C (81.8 pbw of BA, 18.2 pbw of styrene, 2.69 pbw of aqueous solution of SDBS, 10.05% conc.; 2.92 pbw of aqueous solution of sodium p-nitrosophenolate, 12% conc.; and 87 pbw of DI water), D (18.8 pbw of ethanol, 1.31 pbw of aqueous solution of SDBS, 10.05% conc.; and 40.7 pbw of DI water), and E (0.9 pbw of t-butyl peroctoate; 0.3 pbw of aqueous solution of SDBS, 10.05% conc.; and 40.7 pbw of DI water) were individually emulsified. When the reactor temperature stabilized at 87° C., emulsified Mixtures B, C, and D were then separately added into the reactor, with stirring, over a period of 300 minutes. Stirring was continued at 87° C. for 60 minutes, after which the reactor contents were cooled to room temperature. The resulting emulsion particles had a diameter of 3.2 micrometer as measured by a Beckman Coulter particle size analyzer Multisizer IIe.

Example 7R

Repeat of Example 7

The procedure of Example 7 was repeated. The resulting emulsion had MPS of 3.2 micrometer and had 30.05% solids by weight.

Comparative Example C8

Preparation of Comparative Particles

Mixtures A (1 pbw of Triton™ X-405; and 100 pbw of DI water) and B (2.171 pbw of the emulsion produced in Example 6R) were added to a reactor and heated to 60° C. with stirring. Mixture C (81.8 pbw of BA, 18.2 pbw of styrene, 2.69 pbw of aqueous solution of SDBS, 10.05% conc.; 2.92 pbw of aqueous solution of sodium p-nitrosophenolate, 12% conc.; and 100 pbw of DI water) was emulsified and added to the reactor. Stirring was continued at 60° C. for 60 minutes. Mixture D (18.8 pbw of 1-hexanethiol; 1.31 pbw of aqueous solution of SDBS, 10.05% conc.; and 55 pbw of DI water) was emulsified and added to the reactor. Stirring was continued at 60° C. for 60 minutes. Mixture E (0.9 pbw of t-butyl peroctoate; 0.30 pbw of aqueous solution of SDBS, 10.05% conc.; and 20 pbw of DI water) was blended with a high intensity mechanical mixer to form a homogeneous emulsion and added to the reactor. Stirring was continued at 60° C. for 60 minutes. Heat was then slowly applied to the reactor to gradually raise the reactor temperature to 87° C. Stirring was continued at 87° C. for 60 minutes, after which the reactor contents were cooled to room temperature. The resulting emulsion particles had MPS of 3.1 micrometer as measured by a Beckman Coulter particle size analyzer Multisizer IIe.

Example 9

Preparation of Swellable Particles

A reactor was charged with Mixtures A (2.29 pbw of Triton™ X-405; and 300 pbw of DI water) and B (17.5 pbw of the aqueous emulsion produced in Example 7R), and heated to 87° C. Mixtures C (130.9 pbw of BA; 29.07 pbw of styrene; 180 pbw of aqueous solution of SDBS, 0.3% conc.; 4.5 pbw of aqueous solution of sodium p-nitrosophenolate, 12% conc.; D (30.08 pbw 1-hexanethiol; 150 pbw aqueous solution of SDBS, 0.13% conc.; and E (1.44 pbw of t-butyl peroctoate; and 120 pbw of aqueous solution of SDBS, 0.04% conc.) were individually emulsified. When the reactor temperature stabilized at 87° C., homogenized Mixtures B, C, and D were then separately added into the reactor, with stirring, over a period of 300 minutes. Stirring was continued at 87° C. for 60 minutes, after which the reactor contents were cooled to room temperature. The resulting emulsion particles had MPS of 10.2 micrometer as measured by Coulter Counter.

Example 10

Preparation of Swellable Particles

A reactor equipped with stirrer and condenser and blanked with nitrogen was charged with Mixtures A (2.20 pbw of Triton™ X-405; and 220 pbw of DI water) and B (11 pbw of the suspension produced by Example 3, 20.0% solids), and heated to 85° C. Mixtures C (110 pbw of BA; 30 pbw of styrene; 7.1 pbw of aqueous solution of SDBS, 5.05% conc.; 4 pbw of aqueous solution of sodium p-nitrosophenolate, 12% conc.; 120 pbw of DI water; and 1.44 pbw of t-butyl peroctoate), and D (24 pbw of 1-hexanethiol; 3.45 pbw of aqueous solution of SDBS, 5.05% conc.; 130 pbw of DI water) were individually emulsified. When the reactor temperature stabilized at 85° C., homogenized Mixtures C and D were then separately added using separate pumps into the reactor over 6 hrs with following feeding profiles. During the first hour, 5% by weight of each of mixture C and mixture D was added at a constant rate, followed by 8% of each during the second hour; 12% of each during the third hour; 20% of each during the fourth hour; 25% of each during the fifth hour; and the remainder (i.e., 30%) of each during the sixth hour.

After feeding, the temperature was maintained at 85° C. for additional 2 hrs and then cooled to room temperature. Resulting particles had MPS of 6.9 micrometers, as measured by Coulter Counter.

Example 11

Preparation of Swellable Particles

A reactor equipped with stirrer and condenser and blanked with nitrogen was charged with Mixtures A (2.2 pbw of Triton™ X-405; 140 pbw of DI water; and 40 pbw of aqueous solution of hydroxypropylmethyl cellulose, 0.8% conc.) and B (the aqueous dispersion produced in Example 10), and heated to 84° C. over 30 minutes. Mixtures C (110 pbw of BA; 30 pbw of styrene; 7.1 pbw of aqueous solution of SDBS, 5.05% conc.; 4 pbw of aqueous solution of sodium p-nitrosophenolate, 12% conc.; 130 pbw of DI water; and 1.5 pbw of t-butyl peroctoate) and D (24 pbw of 1-hexanethiol; 3.45 pbw of aqueous solution of SDBS, 5.05% conc.; and 145 pbw of DI water) were individually emulsified. When the reactor temperature stabilized at 84° C., homogenized Mixtures C and D were then separately added into the reactor over 6 hrs with the same feeding profiles used in Example 10. After feeding, the temperature was maintained at 84° C. for additional 2 hrs, and the reactor was then cooled to room temperature. The resulting dispersion of particles had MPS of 22 micrometer, as measured by Coulter Counter, and solids of 20%.

Example 12

Preparation of Swellable Particles

To the reaction kettle was charged 2.29 g of Triton™ X-405, 300 g of DI Water, and 23.75 g of the emulsion produced in Example 6. The reaction kettle was heated to 87° C. over 45 minutes. The following preparation procedure was then followed: In a first bottle, monomer emulsion was prepared by emulsifying a mixture of 29.07 g styrene, 130.93 g BA, and 180 g SDBS aqueous solution (0.3% conc.). In a second bottle, 30.08 g of 1-hexanethiol in 150 g of SDBS aqueous solution (0.13% conc.) was emulsified at 12,000 revolutions per minute (i.e., 12 krpm) for 3 minutes. In third bottle, 1.44 g of t-Butyl peroctoate in 120 g of SDBS aqueous solution (0.04% conc.) was emulsified for 3 minutes at 11 krpm. The three emulsions were then fed separately and simultaneously into the above reaction kettle over 300 minutes at constant rate. After feeding, the reaction kettle was held at 85° C. for 1 hour.

The resulting swellable particles were used in Example 26, described herein below. Based on the amounts of materials used in Example 26 and the particle size that resulted in Example 26, it was calculated using standard methods that the MPS of the particles produced in Example 12 was 1 micrometer.

Example 13

Preparation of Swellable Particles

To the reaction kettle was charged 2.29 g of Triton™ X-405, 300 g of DI Water, and 2.9 g of the emulsion produced in Example 6. The preparation procedure described in Example 12 was then followed. The resulting swellable particles had MPS of 2 micrometer as measured by Coulter Counter.

Example 14

Preparation of Swellable Particles

To the reaction kettle was charged 2.29 g of Triton™ X-405, 300 g of DI Water, and 1.48 g of the emulsion produced in Example 5. The preparation procedure described in Example SPI was then followed. The resulting swellable particles had MPS of 3 micrometer as measured by Coulter Counter.

Example 15

Preparation of Swellable Particles

To the reaction kettle was charged 50 g of Metolose™ 400 90SH aqueous solution (0.5% conc.), 2.29 g of Triton™ X-405, 250 g of DI Water, and 5.23 g of the emulsion produced in Example 7. The preparation procedure described in Example 12 was then followed. The resulting swellable particles had MPS of 20 micrometer as measured by Coulter Counter.

Example 16

Preparation of Swellable Particle

A reactor was charged with Mixtures A (2.29 pbw of Triton™ X-405; and 300 pbw of DI water) and B (17.5 pbw of the aqueous emulsion produced in Example 4), and heated to 87° C. Mixture C (130.9 pbw of BA; 29.07 pbw of styrene; 180 pbw of aqueous solution of SDBS, 0.3% conc.; 4.5 pbw of aqueous solution of sodium p-nitrosophenolate, 12% conc.), D (30.08 pbw 1-hexanethiol; 150 pbw aqueous solution of SDBS, 0.13% conc.), and E (1.44 pbw of t-butyl peroctoate; and 120 pbw of aqueous solution of SDBS, 0.04% conc.) were individually emulsified. When the reactor temperature stabilized at 87° C., emulsified Mixtures C, D, and E were then separately added into the reactor, with stirring, over a period of 300 minutes. Stirring was continued at 87° C. for 60 minutes, after which the reactor contents were cooled to room temperature. The resulting emulsion particles had MPS of 12.1 micrometer as measured by Coulter Counter.

Example 17

Preparation of Polymeric Resin

Mixture A (9.244 pbw of the aqueous emulsion produced in Example 7; 0.19 pbw of aqueous solution of SDOSS, 4.12% conc.; 100 pbw aqueous solution of poly(vinyl alcohol), 5% conc.; and 333 pbw of DI water) was added to a pressure bottle. Mixture B (100 pbw of DVB; 19.22 pbw of aqueous solution of SDOSS, 4.12% conc.; 18.05 pbw of aqueous solution of methyl beta-cyclodextrin, 50.8% conc.; and 66.7 pbw of DI water) was emulsified and added to the bottle. After the air in the bottle was replaced by nitrogen, the bottle was capped and placed in a shaker bath at 60° C. Shaker speed was maintained at 84 strokes per minute and the shaking was continued for 120 minutes. Mixture C (1 pbw of t-butyl peroctoate; 0.58 pbw of aqueous solution of SDOSS, 4.12% conc.; 0.044 pbw of sodium nitrite; and 16.7 pbw DI water) was emulsified and injected into the bottle. The bottle was shaken in the shaker bath at 60° C. for 60 minutes and then at 88° C. for 120 minutes, after which the bottle contents were cooled to room temperature.

Example 18

Preparation of Polymeric Resin

Mixture A (4.687 pbw of the aqueous emulsion produced in Example 7; 0.19 pbw of aqueous solution of SDOSS, 4.12% conc.; 100 pbw aqueous solution of poly(vinyl alcohol), 5% conc.; and 333 pbw of DI water) was added to a pressure bottle. Mixtures B and C were made, emulsified, and used, using the ingredients and the procedures of Example 17.

Example 19

Preparation of Polymeric Resin

Mixture A (2.684 pbw of the aqueous emulsion produced in Example 7; 0.19 pbw of aqueous solution of SDOSS, 4.12% conc.; 100 pbw aqueous solution of poly(vinyl alcohol), 5% conc.; and 333 pbw of DI water) was added to a pressure bottle. Mixtures B and C were made, emulsified, and used, using the ingredients and the procedures of Example 17.

Comparative Example C20

Preparation of Comparative Polymeric Resin

Mixture A (9.222 pbw of the aqueous emulsion produced in Comparative Example C8; 0.19 pbw of aqueous solution of SDOSS, 4.12% conc.; 100 pbw aqueous solution of poly (vinyl alcohol), 5% conc.; and 333 pbw of DI water) was added to a pressure bottle. Mixtures B and C were made, emulsified, and used, using the ingredients and the procedures of Example 17.

Comparative Example C21

Preparation of Comparative Polymeric Resin

Mixture A (4.676 pbw of the aqueous emulsion produced in Comparative Example C8; 0.19 pbw of aqueous solution of SDOSS, 4.12% conc.; 100 pbw aqueous solution of poly (vinyl alcohol), 5% conc.; and 333 pbw of DI water) was added to a pressure bottle. Mixtures B and C were made, emulsified, and used, using the ingredients and the procedures of Example 17.

Comparative Example C22

Preparation of Comparative Polymeric Resin

Mixture A (2.677 pbw of the aqueous emulsion produced in Comparative Example C8; 0.19 pbw of aqueous solution of SDOSS, 4.12% conc.; 100 pbw aqueous solution of poly (vinyl alcohol), 5% conc.; and 333 pbw of DI water) was added to a pressure bottle. Mixtures B and C were made, emulsified, and used, using the ingredients and the procedures of Example 17.

Example 23

Preparation of Polymeric Resin

A reactor was charged with Mixture A (60 pbw of aqueous solution of hydroxypropylmethyl cellulose, 0.8% conc.; 2 pbw of Triton™ X-405; 20 pbw of DI water; 20 pbw of the aqueous emulsion produced in Example 11). The reactor was heated to 60° C. over 15 minutes. Mixtures B (69 pbw of DVB; 37.5 pbw of xylene; 37.5 pbw of methyl isobutyl carbitol ("MIBC"); 70 pbw of aqueous solution of SDOSS, 1% conc.; 20 pbw DI water) and C (1 pbw of t-butyl peroctoate; 2.5 pbw of aqueous solution of sodium p-nitrosophenolate; 6 pbw of aqueous solution of SDOSS, 1% conc.) were individually emulsified. Mixture B emulsion was charged into the reactor, and the reactor was held at 60° C. for 2 hours. Mixture C emulsion and Mixture D (20 pbw of aqueous solution of hydroxypropylmethyl cellulose, 0.8% conc.) were charged into the reactor, which was then held for 45 minutes at 60° C. The reactor was heated to 70° C. over 30 minutes and held for 1 hr. The reactor was heated to 80° C. and held for 12 hrs. After the reactor was cooled to room temperature, white microbeads were isolated by filtration. Solid particles were then washed with water, acetone and water, and dried in an oven at 60° C. Opaque microbeads were obtained with MPS of 70 micrometers, as measured by Scanning Electron Microscopy ("SEM"). The microbeads were macroporous; they are optically opaque, and the porosity was observed by SEM.

Example 24

Preparation of Polymeric Resin

To the reaction kettle was charged 73 g of water, 6.3 g of a dispersion (18% solids) of the swellable particles of Example 10, 7.7 g of an aqueous solution of SDOSS (1% conc.), and 25 g of an aqueous solution of Metolose™ 400 90SH (1% conc.). The agitator was started at 60 RPM. An initiator emulsion was prepared by combining 1 g of tert-butyl peroctoate, 13 g of an aqueous solution of Triton™ X-405 (1% conc.), and 10.4 g of diethyl phthalate, and emulsifying this mixture at 11 krpm for one minute. The initiator emulsion was added to the reaction kettle, and the mixture was allowed to equilibrate for 20 minutes. After the 20 minutes, 225 g of an aqueous solution of Metolose™ 400 90SH (1% conc.) was added. A monomer emulsion was prepared by combining 33.6 g of GMA, 22.4 g of EGDMA, 93.6 g of diethyl phthalate (porogen), and 70 g of an aqueous solution of SDOSS (1% conc.) and emulsifying this mixture at 11 krpm for two minutes. The monomer emulsion was added to the reaction kettle, and the mixing jar was rinsed with 60 g of water, which was also added to the reaction kettle. The reaction kettle was heated to 40° C. over 15 minutes and held at temperature for 2 hours. At which point, the reaction kettle was heated to 70° C. over 45 minutes and held for 1 hour. Next, the reaction kettle was heated to 80° C. over 30 minutes and held at temperature for 12 hours. Finally, the reaction kettle was cooled to room temperature. The resin was isolated by filtration, and the porogen was removed by washing with water, acetone, methanol, and again with water. The resin was stored in 20% aqueous ethanol solution. The resin had mean particle size of 32 micrometers as measured by optical microscopy.

Example 25

Preparation 60 Micrometer GMA/EGDMA Polymeric Resin

To the reaction kettle was charged 73 g of water, 6.3 g of a dispersion (18% solids) of the swellable particles of Example 16, 7.7 g of an aqueous solution of SDOSS (1% conc.), and 25 g of an aqueous solution of Metolose™ 400 90SH (1% conc.). The procedure of Example 24 was then followed. The resulting resin had mean particle size of 57 micrometers as measured by optical microscopy.

Example 26

Preparation of 10 Micrometer STY/DVB Polymeric Resin

To the reaction kettle was charged 88.3 g of water, 10.9 g of a dispersion (30% solids) of the swellable particles made in Example 14, 5 g of an aqueous solution of SDOSS (1% conc.), and 25 g of an aqueous solution of Metolose™ 400 90SH (1% conc.). The agitator was started at 80 RPM. An initiator emulsion was prepared by combining 0.8 g of tert-butyl peroctoate, 10.9 g of an aqueous solution of SDOSS (1% conc.), and 5.2 g of 4-methyl-2-pentanol and emulsifying this mixture at 11 krpm for one minute. The initiator emulsion was added to the reaction kettle, and the mixture was allowed to equilibrate for 20 minutes. After the 20 minutes, 225 g of an aqueous solution of Metolose™ 400 90SH (1% conc.) was added. A monomer emulsion was prepared by combining 58.1 g of styrene, 19.4 g of DVB, 46.5 g of 4-methyl-2-pentanol, and 86.6 g of an aqueous solution of SDOSS (1% conc.) and emulsifying this mixture at 11 krpm for two minutes. The monomer emulsion was added to the reaction kettle, and the mixing jar rinsed with 60 g of water, which was added to the reaction kettle. The reaction kettle was heated to 40° C. over 15 minutes and held at temperature for 2 hours. At which point, the reaction kettle was heated to 70° C. over 45 minutes and held for 12 hours. Next, the reaction kettle was heated to 80° C. over 30 minutes and held at temperature for 4 hours. The reaction kettle was then cooled to room temperature. A solution of 12.5 g Deerland Cellulase 4000™ enzyme in 52.3 g of water was added, and the mixture was heated to 50° C. over 30 minutes and held at temperature for 5 hours.

The reaction kettle was then cooled to room temperature. The resin was isolated by filtration, and the porogen was removed by washing with water, acetone, methanol. The resin was dried under vacuum. The resin had MPS of 10 micrometers as measured by optical microscopy.

Example 27

Preparation of Polymeric Resin

To the reaction kettle was charged 73 g of water, 6.3 g of a dispersion (18% solids) of the swellable particles of Example 10 (7 µm), 7.7 g of an aqueous solution of SDOSS (1% conc.) and 25 g of an aqueous solution of Metolose™ 400 90SH (1% conc.). The agitator was started at 60 RPM. An initiator emulsion was prepared by combining 1 g of tert-butyl peroctoate, 13 g of an aqueous solution of SDOSS (1% conc.), and 8 g of cyclohexanol and emulsifying this mixture at 11 krpm for one minute. The initiator emulsion was added to the reaction kettle, and the mixture was allowed to equilibrate for 20 minutes. After the 20 minutes, 225 g of an aqueous solution of Metolose™ 400 90SH (1% conc.) was added. A monomer emulsion was prepared by combining 48 g of vinyl acetate, 32 g of triallyl isocyanurate, 72 g of cyclohexanol, and 70 g of an aqueous solution of SDOSS (1% conc.) and emulsifying this mixture at 11 krpm for two minutes. The monomer emulsion was added to the reaction kettle, and the mixing jar was rinsed with 60 g of water, which was added to the reaction kettle. The reaction kettle was heated to 40° C. over 15 minutes and held at temperature for 1 hour. At which point, the reaction kettle was heated to 70° C. over 45 minutes and held for 1 hour. Next, the reaction kettle was heated to 80° C. over 30 minutes and held at temperature for 12 hours. Finally, the reaction kettle was cooled to room temperature. The resin was isolated by filtration, and the porogen was removed by washing with water, acetone, methanol and again with water. The resin was stored in 20% aqueous ethanol solution. The resin had mean particle size of 30 micrometers as measured by optical microscopy.

Example 28

Preparation of 3 Micrometer GMA/EGDMA Polymeric Resin

To the reaction kettle was charged 73 g of water, 8.7 g of a dispersion (30% solids) of the swellable particles of Example 5 (0.63 µm), 7.7 g of an aqueous solution of SDOSS (1% conc.), and 25 g of an aqueous solution of Metolose™ 400 90SH (1% conc.). The agitator was started at 60 RPM. An initiator emulsion was prepared by combining 1.6 g of tert-butyl peroctoate and 13 g of an aqueous solution of SDOSS (1% conc.). The initiator emulsion was added to the reaction kettle, and the mixture was allowed to equilibrate for 20 minutes. After the 20 minutes, 225 g of an aqueous solution of Metolose™ 400 90SH (1% conc.) was added. A monomer emulsion was prepared by combining 96 g of GMA, 64 g of EGDMA, and 70 g of an aqueous solution of SDOSS (1% conc.) and emulsifying this mixture at 11 krpm for two minutes. The monomer emulsion was added to the reaction kettle, and the mixing jar was rinsed with 60 g of water, which was added to the reaction kettle. The reaction kettle was heated to 40° C. over 15 minutes and held at temperature for 2 hours. At which point, the reaction kettle was heated to 70° C. over 45 minutes and held for 1 hour. Next, the reaction kettle was heated to 80° C. over 30 minutes and held at temperature for 12 hours. Finally, the reaction kettle was cooled to room temperature. The resin was isolated by filtration and resin washed with water, acetone, methanol and again with water. The resin was stored in 20% aqueous ethanol solution. The resin had mean particle size of 3 micrometers as measured by optical microscopy.

Example 29

Preparation of a Strong Cation Exchange Resin

The polymeric resin of Example 24 was suction dried. To the reaction kettle was charged 100 g of this suction-dried resin, 270 g of sodium dithionite, and 700 g of DI water. The mixture was suspended with stirring, and the mixture was heated to 80° C. for 16 hours. The reaction kettle was cooled to room temperature. The resin was isolated by filtration, and the excess salts were removed by washing with water, methanol, and again with water. The resin was stored in 20% aqueous ethanol solution.

The dynamic insulin capacity was tested as follows. 1.25 g insulin was dissolved in 250 g of a solvent (60% water, 0.1% trifluoroacetic acid, and 40% ethanol, by weight based on the weight of solvent). The insulin solution was passed though an HP 1100 high performance liquid chromatography system using a column packed with the particles of the functionalized resin of this Example, at approximately 2 ml/minute, with a UV detector set to 280 nm. The breakthrough curve is recorded and analyzed by standard chromatographic techniques, and the capacity at 1% breakthrough is reported.

The dynamic insulin capacity of this material was shown to be 130 mg/mL at 1% breakthrough.

Example 30

Preparation of Strong Cation Exchange Resin

The polymeric resin of Example 24 was suction dried. To the reaction kettle was charged 100 g of that suction-dried resin, 160 g of sodium sulfite, and 700 g of DI water. The mixture was suspended with stirring, and the mixture was heated to 80° C. for 16 hours. The reaction kettle was cooled to room temperature. The resin was isolated by filtration, and the excess salts were removed by washing with water, methanol, and again with water. The resin was stored in 20% aqueous ethanol solution. The dynamic insulin capacity of this material (measured by the same method as that of Example 29) was 140 mg/mL at 1% breakthrough.

Example 31

Preparation of a Strong Anion Exchange Resin

The polymeric resin of Example 24 was suction dried. To the reaction kettle was charged 100 g of this suction dried resin, 250 g of trimethylammonium chloride and 250 g of water. The mixture was suspended with stirring and the mixture heated to 80° C. for 16 hours. The reaction kettle was cooled to room temperature. The resin was isolated by filtration and the excess salts were removed by washing with water, methanol, and again with water. The resin was stored in 20% aqueous ethanol solution. The dynamic Bovine Serum Albumin (BSA) capacity (measured using the methods of Example 29, using bovine serum albumin instead of insulin) of this material was shown to be 90 mg/mL at 1% breakthrough.

Example 32

Hydrolysis of Copolymer Resin

The polymeric resin of Example 27 was suction dried. To the reaction kettle was charged 47.6 g of this suction dried resin and 250 g of 3% (w/w) aqueous solution of NaOH. The mixture was stirred at room temperature for 20 hours. The resin was isolated by filtration, and the excess base was removed by washing with water until the washings were of neutral pH. The resin was stored in 20% aqueous ethanol solution.

Example 33

Preparation of a Weak Anion Exchange Resin

The polymeric resin of Example 28 was suction dried. To the reaction kettle was charged 100 g of this suction-dried resin, 286.6 g of diethylamine hydrochloride, and 250 g of water. The mixture was suspended with stirring, and the mixture was heated to 80° C. for 16 hours. The reaction kettle was cooled to room temperature. The resin was isolated by filtration and the excess salts are removed by washing with water, methanol, and again with water. The resin is stored in 20% aqueous ethanol solution.

Example 34

Test Results for Particle Size Distribution

About 15 grams of emulsion sample from each of Examples 7 to 12 were weighed into a glass tube. The glass tubes containing the emulsion samples were spun on an International Equipment Company (IEC) Clinic centrifuge at Setting 2 and room temperature for 10 minutes. Small particles remained suspended in the supernatant were separated from the settled main population of particles. The amount of small particles in each sample was then determined by gravimetric method and reported as the ratio of the dry weight of suspended particles to the total dry weight of polymeric resin, expressed as a percentage. The results are in the following table.

| Polymeric Resin | Suspended Particles (%) |
|---|---|
| Example 17 | 3.8% |
| Example 18 | 3.7% |
| Example 19 | 9.8% |
| Comparative Example C20 | 4.7% |
| Comparative Example C21 | 5.2% |
| Comparative Example C22 | 14.2% |

Example 17 shows fewer suspended (i.e., small-size) particles than its comparable counterpart, Comparative Example C20. Similarly, Example 18 shows fewer suspended particles than the comparable Comparative Example C21; and Example 19 shows fewer suspended particles than the comparable Comparative Example C12. Examples 17, 18, and 19 have fewer small-size particles than their comparative counterparts because Examples 17, 18, and 19 were made using the swellable particles of Example 7, while the counterparts were made using the particles of Comparative Example C8. Thus it is concluded that Example 7 likewise contains fewer small-size particles than does Comparative Example C8.

Example 35

Capacity and Recovery of Functionalized Resins

Four commercially available resins were tested: Source™ 30S, from GE Healthcare; Macroprep™ 25S, from Bio-Rad; Toyopearl™ SP-650S, from Tosoh Biosciences; and PrepEx™ SP from Mitsubishi. Both the 1% capacity and the total capacity were measured for three test materials (Insulin, Lysozyme, and Hemoglobin), using the methods described in Example 29 above. Also, after each capacity measurement, the solvent was changed to remove the test material from the column, and the recovery (as weight % of the test material used) was measured.

The test conditions were as follows. Solvent pH was adjusted with HCl or NaOH as necessary to achieve the stated pH. Samples were tested at low salt level and high salt level. In the low salt level tests, the salt present was the relatively low amounts carried into the test by the various ingredients. In the high salt level tests, the concentration of sodium chloride was 200 mM.

| Test Material | Characteristics | Test Solvent | Recovery Solvent |
|---|---|---|---|
| Insulin | 5.7 kDa, 5.7 pI | 60% water 40% ethanol 0.1% TFA | Test Solvent plus 1M NaCl |
| Lysozyme | 14.3 kDa, 10.0 pI | Aqueous solution, 0.1 M sodium phosphate, pH = 5.8 | Test Solvent plus 1M NaCl |
| Hemoglobin | 64 kDa, 6.0 pI | Aqueous solution, 0.1 M sodium phosphate, pH = 3.28 | Test Solvent plus 1M NaCl |

The results for 1% capacity:

| Resin (Salt Level) | Insulin (Low) | Lysozyme (Low) | Hemoglobin (Low) | Insulin (High) |
|---|---|---|---|---|
| Source ™ 30S | 72 mg/ml | 58 mg/ml | 85 mg/ml | 6 |
| Macroprep ™ 25S | 71 mg/ml | 31 mg/ml | 65 mg/ml | not tested |
| Toyopearl ™ SP-650 | 67 mg/ml | 44 mg/ml | not tested | 7 |
| PrepEx ™ SP | 32 mg/ml | 33 mg/ml | 31 mg/ml | not tested |
| Example 30 | 140 mg/ml | 90 mg/ml | 128 mg/ml | 58 |
| Example 29 | 130 mg/ml | 88 mg/ml | 110 mg/ml | 59 |

The results for total capacity:

| Resin (Salt Level) | Insulin (Low) | Lysozyme (Low) | Hemoglobin (Low) | Insulin (High) |
|---|---|---|---|---|
| Source ™ 30S | 79 mg/ml | 58 mg/ml | 107 mg/ml | 45 |
| Macroprep ™ 25S | 86 mg/ml | 35 mg/ml | 81 mg/ml | not tested |
| Toyopearl ™ SP-650 | 72 mg/ml | 53 mg/ml | not tested | 36 |
| PrepEx ™ SP | 39 mg/ml | 57 mg/ml | 57 mg/ml | not tested |
| Example 30 | 152 mg/ml | 94 mg/ml | 150 mg/ml | 67 |
| Example 29 | 145 mg/ml | 94 mg/ml | 158 mg/ml | 78 |

The recovery results:

| Resin (Salt Level) | Insulin (Low) | Lysozyme (Low) | Hemoglobin (Low) | Insulin (High) |
|---|---|---|---|---|
| Source™ 30S | 94% | 100% | 11% | 69 |
| Macroprep™ 25S | 60% | 93% | 71% | not tested |
| Toyopearl™ SP-650 | 95% | 100% | not tested | 27 |
| PrepEx™ SP | 79% | 52% | 37% | not tested |
| Example 30 | 91% | 100% | 40% | 92 |
| Example 29 | 95% | 75% | 21% | 73 |

The 1% capacities and total capacities of the Example resins are superior to those of the commercially available resins. The recoveries of the Example resins are high enough to be useful and are, for each test material, at least as high as the recovery of at least one of the commercially available resins.

Example 36

Preparation of STY/DVB Polymeric Resin

To the reaction kettle was charged 88.3 g of water, 6.0 g of a dispersion (30% solids) of the swellable particles made in Example 14, 5 g of an aqueous solution of SDOSS (1% conc.), and 25 g of an aqueous solution of Metolose™ 400 90SH (1% conc.). The agitator was started at 80 RPM. An initiator emulsion was prepared by combining 0.8 g of tert-butyl peroctoate, 10.9 g of an aqueous solution of SDOSS (1% conc.), and 5.2 g of 4-methyl-2-pentanol and emulsifying this mixture at 11 kHz for one minute. The initiator emulsion was added to the reaction kettle, and the mixture was allowed to equilibrate for 20 minutes. After the 20 minutes, 225 g of an aqueous solution of Metolose™ 400 90SH (1% conc.) was added. A monomer emulsion was prepared by combining 58.1 g of styrene, 19.4 g of DVB, 46.5 g of 4-methyl-2-pentanol, and 86.6 g of an aqueous solution of SDOSS (1% conc.) and emulsifying this mixture at 11 kHz for two minutes. The monomer emulsion was added to the reaction kettle, and the mixing jar rinsed with 60 g of water, which was added to the reaction kettle. The reaction kettle was heated to 40° C. over 15 minutes and held at temperature for 2 hours. At which point, the reaction kettle was heated to 70° C. over 45 minutes and held for 12 hours. Next, the reaction kettle was heated to 80° C. over 30 minutes and held at temperature for 4 hours. The reaction kettle was then cooled to room temperature. A solution of 12.5 g Deerland Cellulase 4000™ enzyme in 52.3 g of water was added, and the mixture was heated to 50° C. over 30 minutes and held at temperature for 5 hours. The reaction kettle was then cooled to room temperature. The resin was isolated by filtration, and the porogen was removed by washing with water, acetone, methanol. The resin was dried under vacuum. The resin had MPS of 12 micrometers as measured by optical microscopy.

Example 37

Preparation of a Cation Exchange Resin

The following procedure was used to produce an ion exchange resin:
The polymeric resin of Example 36 was vacuum dried. To the reaction kettle was charged 1000 g of 96% sulfuric acid and 25 g of this dry resin with stirring. The mixture was heated to 130° C. for 4 hours. The mixture was cooled to 60° C. and subsequent additions of diluted acid solutions were added along with removal of the subsequent dilute acid solution, maintaining a temperature of less than 110)° C., until less than 5% of the total acid remained. The resin was then washed two times with 500 mL of deionized water each time.

Example 38

Preparation of a Hydrophobic Interaction Chromatographic Resin

The following procedure could be used to produce a hydrophobic interaction resin:
The polymeric resin of Example 28 is suction dried. To the reaction kettle is charged this suction-dried resin, n-butan-1-ol and catalytic acid. The mixture is suspended with stirring, and the mixture is heated to 80° C. for 16 hours. The reaction kettle is cooled to room temperature. The resin is isolated by filtration and the excess butanol is removed by washing with water, methanol, and again with water. The resin is stored in 20% aqueous ethanol solution.

Example 39

Preparation of an Immobilized Metal Affinity Chromatography (IMAC) Resin

The following procedure could be used to produce an IMAC resin:
The polymeric resin of Example 28 is suction dried. To the reaction kettle is charged this suction-dried resin, sodium iminodiacetate and 0.1N sodium carbonate. The mixture is suspended with stirring, and the mixture is heated to 80° C. for 16 hours. The reaction kettle is cooled to room temperature. The resin is isolated by filtration and the excess salt is removed by washing with water, methanol, and again with water. The resin is stored in 20% aqueous ethanol solution.

Example 40

Preparation of a Protein Affinity Resin

The following procedure could be used to produce an Protein A affinity resin:
The polymeric resin of Example 28 is suction dried. To the reaction kettle is charged this suction-dried resin, protein A and buffer. The mixture is suspended with stirring, and the mixture is incubated at room temperature for 72 hours. The resin is isolated by filtration and the resin washed with buffer and then water. The resin is stored in 20% aqueous ethanol solution.

Example 41

Preparation of a Mercaptoethyl Pyridine (MEP) Affinity Resin

The following procedure could be used to produce a MEP affinity resin:
The polymeric resin of Example 28 is suction dried. To the reaction kettle is charged this suction-dried resin, mercaptoethyl pyridine and catalytic acid or base. The mixture is suspended with stirring, and the mixture is heated to 80° C. for 16 hours. The reaction kettle is cooled to room temperature. The resin is isolated by filtration and the excess mercaptan is removed by washing with water, methanol, and again with water. The resin is stored in 20% aqueous ethanol solution.

Example 42

Rigidity of Functionalized Resins

Each resin was added as a slurry to a column. Columns had inside diameter (ID) of 2.5 cm or 9 cm. The resin was allowed to settle until a stable bed was formed. While solution was pumped through the resin bed, the pressure drop from the entrance of the column to the exit was measured.

The test results are reported as a pressure drop ($\Delta P$) as a function of normalized velocity (NV), which is defined by $NV = LV * L_c * \eta / (4 * dp^2)$, where LV is linear velocity, $L_c$ is resin bed height, $\eta$ is the viscosity, and dp is resin particle diameter.

The first control sample ("C1") was Toyopearl™ SP650S (column ID was 2.5 cm, solovent was water, $L_c$ was 15 cm, $\eta$ was 1.0 mPa·s, and dp was 35 micrometers). The second control sample ("C1") was SP Sepharose™ HP, from GE Healthcare (column ID was 2.5 cm, solovent was water, $L_c$ was 15 cm, $\eta$ was 1.0 mPa·s, and dp was 34 micrometers). Also tested was the resin from Example 30 (column ID was 9.0 cm, solovent was water, $L_c$ was 8 cm, $\eta$ was 1.8 mPa·s, and dp was 30 micrometers).

|            | LV (cm/hr) | NV  | $\Delta P$ (bar) |
|------------|------------|-----|------------------|
| C1         | 0          | 0.0 | 0.0              |
| C1         | 61         | 0.2 | 0.2              |
| C1         | 122        | 0.4 | 0.3              |
| C1         | 245        | 0.7 | 0.8              |
| C1         | 367        | 1.1 | 1.6              |
| C2         | 0          | 0.0 | 0.0              |
| C2         | 61         | 0.2 | 0.2              |
| C2         | 122        | 0.4 | 0.6              |
| C2         | 245        | 0.8 | 1.6              |
| Example 30 | 0          | 0.0 | 0.0              |
| Example 30 | 60         | 0.2 | 0.2              |
| Example 30 | 125        | 0.5 | 0.4              |
| Example 30 | 192        | 0.8 | 0.6              |
| Example 30 | 245        | 1.0 | 0.9              |
| Example 30 | 309        | 1.2 | 1.2              |
| Example 30 | 369        | 1.5 | 1.5              |

Unlike the control samples, Example 30 showed $\Delta P$ values of 1.5 and below at normalized velocities above 1.1, thus demonstrating the superior rigidity of Example 30.

Example 43

Purification of Insulin

A liquid chromatography column of 25 cm length by 1.1 cm inner diameter was packed with the functionalized polymeric resin of Example 30 using typical methods. The column was placed in a liquid chromatography system and loaded to a concentration of 18 mg of crude human insulin per 1 mL of functionalized polymeric resin at a flow rate of 0.83 mL/minute using an aqueous mixture of 40% ethanol with 50 mM acetic acid and 0.1 M sodium chloride at pH 3.7. The purified insulin was eluted by applying a linear gradient from the initial buffer to a final aqueous mixture of 40% ethanol with 50 mM acetic acid and 0.42 M sodium chloride at pH 3.7. The initial and final purities of the crude insulin were 66% and 72%, respectively, as measured by HPLC.

We claim:

1. A method for making swellable particles, said method comprising mixing initial particles, at least one monomer, at least one oil-soluble initiator, and at least one chain-transfer agent,
    wherein said mixing is performed under conditions in which said monomer reacts to form oligomer;
    wherein said initial particles comprise an organic compound,
    wherein said oil-soluble initiator has solubility in water at 20° C., by weight, based on the weight of water, of 1% or less,
    wherein said initiator forms free radicals,
    wherein said oligomer or low molecular weight polymer has number-average molecular weight of less than 2,000,
    wherein the amount of said chain-transfer agent is 10% or more, by weight based on the total weight of said monomer,
    wherein the mean particle diameter said swellable particles is larger than the mean particle diameter of said initial particles by a factor of 2 times or higher, and
    wherein said swellable particles have mean particle diameter of 1 micrometer or more.

2. The method of claim 1, wherein none of said monomer is mixed with said initial particles prior to establishing said conditions in which said monomer reacts to form oligomer.

3. The method of claim 1, wherein none of said chain transfer agent is mixed with said initial particles prior to establishing said conditions in which said monomer reacts to form oligomer.

4. The method of claim 1, wherein none of said initiator is mixed with said initial particles prior to establishing said conditions in which said monomer reacts to form oligomer.

5. The method of claim 1, wherein none of said monomer, none of said chain transfer agent, and none of said initiator is mixed with said initial particles prior to establishing said conditions in which said monomer reacts to form oligomer.

6. A method for making secondary swellable particles, said method comprising mixing
    (a) swellable initial particles made by the method of claim 1,
    (b) at least one monomer,
    (c) at least one oil-soluble initiator, wherein said oil-soluble initiator has solubility in water at 20° C., by weight, based on the weight of water, of 1% or less, and
    (d) at least one chain-transfer agent,
    wherein said mixing of said (a), (b), (c), and (d) is performed under conditions in which said monomer (b) reacts to form oligomer or low molecular weight polymer or a mixture thereof, and
    wherein said initiator (c) forms free radicals, and
    wherein said oligomer or low molecular weight polymer in said secondary swellable particles has number-average molecular weight of less than 10,000.

7. The method for making polymeric resin particles comprising mixing at least one subsequent monomer with swellable particles and polymerizing said subsequent monomer, wherein said swellable particles are made by the method of claim 1.

8. Polymeric resin particles made by a method comprising mixing at least one subsequent monomer with swellable particles and polymerizing said subsequent monomer, wherein said swellable particles are made by a method comprising mixing initial particles, at least one monomer, at least one oil-soluble initiator, and at least one chain-transfer agent, wherein said mixing of said initial particles, monomer, oil-soluble initiator, and chain-transfer agent is performed under conditions in which said monomer reacts to form oligomer,
   wherein said initial particles comprise an organic compound, and wherein said oil-soluble initiator has solubility in water at 20° C., by weight, based on the weight of water, of 1% or less,
   wherein said initiator forms free radicals,
   wherein said oligomer or low molecular weight polymer has number-average molecular weight of less than 2,000,
   wherein the amount of said chain-transfer agent is 10% or more, by weight based on the total weight of said monomer,
   wherein the mean particle diameter said swellable particles is larger than the mean particle diameter of said initial particles by a factor of 2 times or higher, and
   wherein said swellable particles have mean particle diameter of 1 micrometer or more.

9. A method for purifying an aqueous solution of mixed biomolecules comprising contacting said aqueous solution with polymeric resin particles made by a method comprising mixing at least one subsequent monomer with swellable particles and polymerizing said subsequent monomer, wherein said swellable particles are made by a method comprising mixing initial particles, at least one monomer, at least one oil-soluble initiator, and at least one chain-transfer agent, wherein said mixing of said initial particles, monomer, oil-soluble initiator, and chain-transfer agent is performed under conditions in which said monomer reacts to form oligomer,
   wherein said initial particles comprise an organic compound, and wherein said oil-soluble initiator has solubility in water at 20° C., by weight, based on the weight of water, of 1% or less,
   wherein said initiator forms free radicals,
   wherein said oligomer or low molecular weight polymer has number-average molecular weight of less than 2,000
   wherein the mean particle diameter of said swellable particles is larger than the mean particle diameter of said initial particles by a factor of 2 times or higher, and
   wherein the amount of said chain-transfer agent is 10% or more, by weight based on the total weight of said monomer.

10. The functionalized polymeric resin particles made by a method comprising reacting the polymeric resin particles of claim 8 with at least one reagent to chemically bind one or more functional groups to said polymeric resin particles, to convert a chemical group on said polymeric resin particles to a functional group, or a combination thereof.

11. The method of claim 9 wherein said method of making said polymeric resin particles further comprises the step of reacting said polymeric resin particles with at least one reagent to chemically bind one or more functional groups to said polymeric resin particles, to convert a chemical group on said polymeric resin particles to a functional group, or a combination thereof.

12. The polymeric resin particles of claim 8, wherein said polymeric resin comprises crosslinked polymer, wherein the amount of crosslinked polymer in said polymeric resin particles that is not soluble in any solvent is 50% or more by dry weight based on the dry weight of said polymeric resin particles.

13. The method of claim 1, wherein said oil-soluble initiator comprises one or more peroxyester.

14. The polymeric resin particles of claim 8, wherein none of said monomer is mixed with said initial particles prior to establishing said conditions in which said monomer reacts to form oligomer.

15. The polymeric resin particles of claim 8, wherein none of said initiator is mixed with said initial particles prior to establishing said conditions in which said monomer reacts to form oligomer.

16. The method of claim 1, wherein said initiator is selected from the group consisting of oil-soluble azo compounds, oil-soluble peroxyesters, oil-soluble peroxydicarbonates, oil-soluble dialkyl peroxides, oil-soluble diacyl peroxides, oil-soluble peroxyketals, oil-soluble ketone peroxides, and mixtures thereof.

17. The method of claim 1, wherein said chain transfer agent is selected from the group consisting of halomethanes, thiols, and mixtures thereof.

18. The method of claim 1,
   wherein said method comprises the step of forming a swellable particle formation mixture,
   wherein said swellable particle formation mixture comprises said initial particles, said monomer, said oil-soluble initiator, and said chain-transfer agent, and
   wherein said step of forming said swellable particle formation mixture is performed under conditions in which said monomer reacts to form oligomer.

* * * * *